(12) United States Patent
Kobayashi et al.

(10) Patent No.: US 6,846,169 B2
(45) Date of Patent: Jan. 25, 2005

(54) MOLD FOR PRODUCING A MULTILAYER MOLDED ARTICLE AND A METHOD FOR PRODUCING A MULTILAYER MOLDED ARTICLE

(75) Inventors: Yoshitaka Kobayashi, Ibaraki (JP); Nobuhiro Usui, Takatsuki (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 205 days.

(21) Appl. No.: 10/107,211

(22) Filed: Mar. 28, 2002

(65) Prior Publication Data
US 2002/0140122 A1 Oct. 3, 2002

(30) Foreign Application Priority Data

| Mar. 30, 2001 | (JP) | 2001-101721 |
| Mar. 30, 2001 | (JP) | 2001-101722 |
| Sep. 18, 2001 | (JP) | 2001-283890 |
| Sep. 18, 2001 | (JP) | 2001-283891 |

(51) Int. Cl.[7] .................... B29C 45/26; B29C 45/33
(52) U.S. Cl. ................ 425/120; 425/573; 425/577
(58) Field of Search ..................... 425/542, 573, 425/577, 120

(56) References Cited

U.S. PATENT DOCUMENTS 4,335,068 A * 6/1982 Hemery ............... 264/245
5,618,485 A * 4/1997 Gajewski ............. 264/255
6,280,666 B1 * 8/2001 Gallagher et al. ...... 264/45.5

FOREIGN PATENT DOCUMENTS

| JP | 2-175111 | 7/1990 |
| JP | 8-25407  | 1/1996 |
| JP | 8-25438  | 1/1996 |
| JP | 11-48284 | 2/1999 |

* cited by examiner

Primary Examiner—Allan R. Kuhns
(74) Attorney, Agent, or Firm—Fitch, Even, Tabin & Flannery

(57) ABSTRACT

An inventive mold is adapted to adhere skin materials having a boundary portion and a resin to each other, and is provided with a resin blocking member which is so embedded as to extend substantially along the boundary portion of the skin materials placed in the mold, and a movable member for projecting the resin blocking member from a molding surface. If such a mold is used, a flow of the resin supplied into the mold can be controlled by projecting the resin blocking member to thereby control an arrival timing of the resin at the boundary portion. Thus, displacement of the boundary portion and wrinkling can be securely prevented from occurring.

7 Claims, 19 Drawing Sheets

MOLD FOR PRODUCING A MULTILAYER MOLDED ARTICLE AND A METHOD FOR PRODUCING A MULTILAYER MOLDED ARTICLE

BACKGROUND OF THE INVENTION

1. Field of the Invention

The present invention relates to a mold effectively used for producing a multilayer molded article in which skin materials are adhered to a base member made of a thermoplastic resin, and a method for producing a multilayer molded article.

2. Description of the Related Art

A multilayer molded article in which skin materials are adhered to the outer surface of a base member made of a thermoplastic resin is excellent in aspect of production costs, lightweight property and shape-imparting property and is frequently used in a wide range of fields including interior parts (e.g. door trims, instrument panels) of automotive vehicles and interior and exterior parts of household appliances.

Molded objects having a plurality of design surfaces formed on the outer surfaces thereof (hereinafter may also be referred to as "multifaced molded objects") are known as the above multilayer molded articles. For example, if a plurality design surfaces having different patterns or materials are formed, the outer surfaces of a base member can be effectively decorated. Molded objects in which one skin material having a plurality of design surfaces is adhered to the base member and molded objects in which a plurality of skin materials are adhered to the base member are known as the above multifaced molded objects. A molded object having a plurality of skin materials adhered thereto is produced, for example, by producing a multilayer molded article according to a molding method for supplying a molten resin to the rear surfaces of a skin material and adhering the skin material and the resin (injection molding method, compression molding method, etc.), then by producing a plurality of multilayer molded articles by the same way, and then by joining these multilayer molded articles on the same plane by, e.g. heat sealing (fusing). The multifaced molded object is also produced by producing a resin base member by an injection molding method, a press molding method (compression molding method) or the like, and adhering a plurality of skin materials to the outer surface of the base member. However, joint portions of the base members may lack strength according to the former method, whereas the skin materials may come off according to the latter method.

As a method for solving these problems, a method is known according to which, for example, a mold comprised of a pair of male and female mold parts are used, two skin materials are inserted into the mold parts with the rear surfaces thereof faced toward the male mold part after being adhered adjacent to each other on the same plane, a molten resin is supplied from the male mold part to adhere the skin materials and the resin. FIG. 1 is a schematic top plan view of a multifaced molded object (planned) sought to be produced by the above producing method, FIG. 2 is a schematic sectional view of the multifaced molded object (planned) when viewed from front, FIGS. 3 and 4 are schematic sectional view used for the explanation of the producing method, and FIG. 5 is a top plan view of the multifaced molded object actually produced by the producing method. As shown in FIGS. 1 and 2, the planned (aimed) multifaced molded object is such that two skin materials (first skin material 1, second skin material 2) are adhered adjacent to each other on the outer surface of a base member 4 made of a thermoplastic resin. A boundary portion (boundary line) 3 between the skin materials 1 and 2 forms a straight line. As shown in FIGS. 3 and 4, a joined skin material in which the first and second skin materials 1, 2 are joined at the boundary portion 3 is inserted into a mold comprised of a male mold part 14 and a female mold part 15 in the case of producing the multifaced molded object. The joined skin material is inserted with the rear surfaces thereof faced toward the male mold part 14 and the front surfaces thereof held in contact with the female mold part 15. A first gate 11 for supplying a molten resin to the rear surface of the first skin material 1 and a second gate 12 for supplying a molten resin to the rear surface of the second skin material 2 are formed in a molding surface (mold surface) of the male mold part 14, and the molten resin is supplied from these gates 11, 12 (see FIG. 3). Then, the female mold part 15 is moved toward the male mold part 14 to mold the resin while pressing it (see FIG. 4). However, according to such a method, the resin coming out from one gate (resin 21 coming out from the first gate 11 in this example) may reach the boundary portion (joined portion) 3 earlier than the resin coming out from the other gate (resin 22 coming out from the second gate 12 in this example), resulting in displacement of the boundary portion 3. Thus, as shown in FIG. 5, the boundary portion 3 between the first and second skin material 1 and 2 meanders, making it difficult to form a straight line (planned line).

In view of the above, a method for molding a resin while fixing a boundary portion 3 has been proposed (Japanese Unexamined Patent Publication No. 175111). FIGS. 6 and 7 are schematic sectional views used for the explanation of this method. This example differs from the one shown in FIGS. 3 and 4 in that a boundary portion 3 between skin materials 1 and 2 is held by a fixing jig 50 embedded in a male mole part 14 (see FIG. 6). However, even if the boundary portion 3 is fixed, an unfixed portion of the boundary portion 3 may be strongly pushed as shown in FIG. 7 if one resin 21 reaches the boundary portion (joined portion) 3 earlier than the other resin 22, resulting in a large displacement of the boundary portion 3. Therefore, similar to the example shown in FIG. 3 and 4, the boundary portion 3 may meander in this example as well.

In the above examples, the two skin materials are used. However, even in the case of using one skin material, the position of the boundary portion may be displaced if a plurality of design surfaces is formed on its outer surface.

Regardless of whether two skin materials are used or one skin material is used, arrival timings of the resins at the boundary portion may largely differ if the design surfaces have largely different areas, if the molded object has a complicated projected and recessed shape, or if the number of the gates increased due to the large size of the molded object. Such largely different arrival timings are likely to degrade the appearance of the molded object due to a displacement of the boundary portion and wrinkling near the boundary portion.

BRIEF SUMMARY OF INVENTION

In view of the above problems, an object of the present invention is to provide a mold capable of securely preventing a displacement of a boundary portion (boundary line) of skin materials and wrinkling, even in the case of producing a molded object (multifaced molded object) in which a plurality of skin materials adjacent to each other on the same plane are adhered to a base member made of a thermoplastic resin, and a method for producing such a molded object.

As a result of repeated diligent researches made to solve the above problems, the inventors of the present invention found out that, in the case of supplying a resin to the rear side of a plurality of skin materials, arrival timings of resins at a boundary portion can be adjusted to substantially match by embedding a resin blocking member substantially along the boundary portion of the skin materials, providing a movable member for projecting the resin blocking members in a mold part located at the rear side of the skin materials, and controlling a flow of the resin from a gate toward the boundary portion by the resin blocking member, and therefore a displacement of the boundary portion (boundary line) and wrinkling can be securely prevented. Based on this finding, we completed the present invention.

The present invention relates to a technique of producing a multilayer molded article by adhering skin materials and a thermoplastic resin by supplying the molten thermoplastic resin to the rear side of a first and a second skin materials adjacent to each other on the same plane, and a mold according to the present invention is a pair of male and female mold parts used to produce the multilayer molded article. The mold part located at the rear side of the skin materials comprises a first gate for supplying the molten thermoplastic resin to the rear side of the first skin material, a second gate for supplying the molten thermoplastic resin to the rear side of the second skin material, a resin blocking member which is so embedded in a molding surface of the mold part as to extend substantially along a boundary portion between the first and second skin materials, and a movable member for projecting the resin blocking member from the molding surface.

According to an inventive method, the first and second skin materials adjacent to each other on the same plane are placed between the pair of male and female mold parts; the molten resin is supplied to the rear surface of the first skin material from the first gate formed in the molding surface of the mold part (male or female) located at the rear side of the skin materials, whereas the molten thermoplastic resin is supplied to the rear surface of the second skin material from the second gate formed in the molding surface of the mold part located at the rear side of the skin surfaces; and the skin materials and the thermoplastic resins are adhered to produce a multilayer molded article. More specifically, the molten thermoplastic resins are supplied while the resin blocking member which is so embedded in the mold surface at the rear side of the skin materials as to extend substantially along the boundary portion of the skin materials is projected, and resin arrival timings at the boundary portion can be controlled by blocking flows of the resins from the respective gates toward the boundary portion by the resin blocking members and withdrawing (accommodating) the resin blocking member into the mold part before filling of the resin in a mold cavity is finished.

In this specification, "a plurality of skin materials adjacent to each other on the same plane" means not only those joined to be adjacent to each other on the same plane, but also one skin material having a plurality of design surfaces adjacent to each other on the same plane. Accordingly, "the first and second skin materials adjacent to each other on the same plane" means not only two skin materials joined to be adjacent to each other on the same plane, but also one skin material having two design surfaces adjacent to each other on the same plane.

Further, in this specification, the term "thermoplastic resin" is used to include a thermoplastic elastomer.

DETAILED DESCRIPTION OF THE INVENTION

Hereinafter, the present invention is described in detail with reference to the accompanying drawings. The present invention is, of course, not restricted to the illustrated embodiment and may be embodied by being suitably changed without departing from the scope and spirit of the invention described above and below, and all of these embodiments are also embraced by the technical scope of the present invention. For example, although a female mold part is used as a mold part to be located at the front side of the skin materials and a male mold part is used as a mold part to be located at the rear (back) side of the skin materials in the following embodiments, the male and female mold parts may be conversely used, specifically the male mold part can be used as the mold part to be located at the front side of the skin materials and female mold part can be used as the mold part to be located at the rear side of the skin materials. Further, resin blocking plates (first embodiment) or a holding member (second embodiment) is used as resin blocking members in the following embodiments. However, various members other than these resin blocking plates and holding member can be used as such provided that they can be projected from a molding surface and the can be control arrival timings of resins at a boundary portion of the skin materials.

First Embodiment

Figure 8:
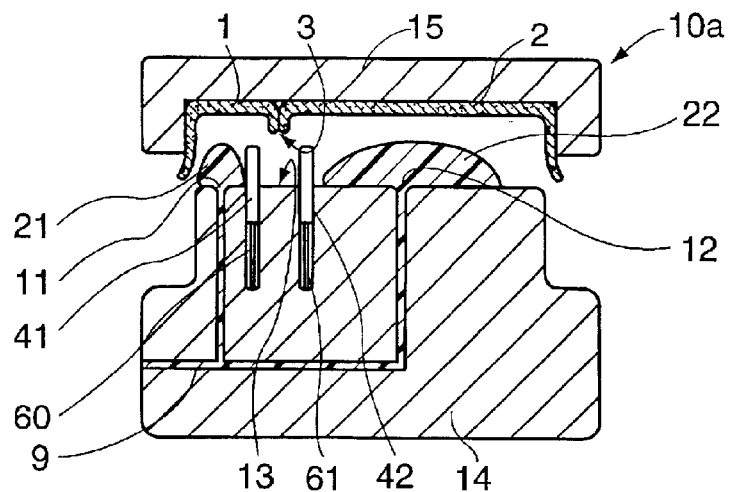
FIG. 8 is a first schematic sectional view showing an example of a mold according to a first embodiment.
Figure 9:
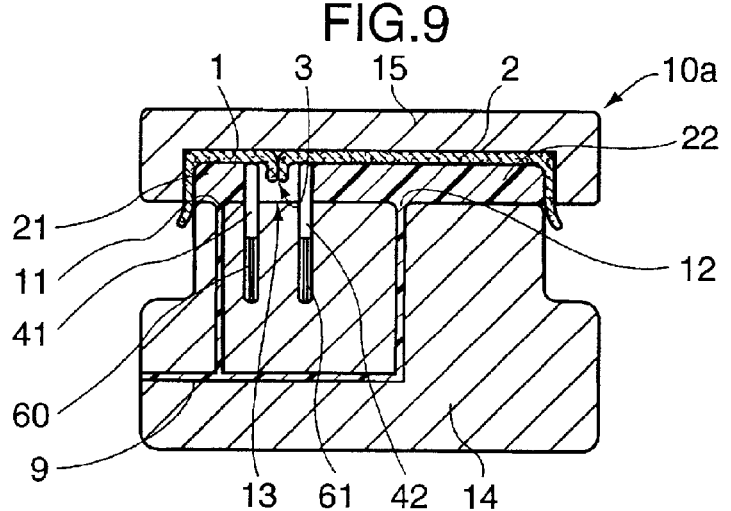
FIG. 9 is a second schematic sectional view showing the example of the mold according to the first embodiment.
Figure 10:
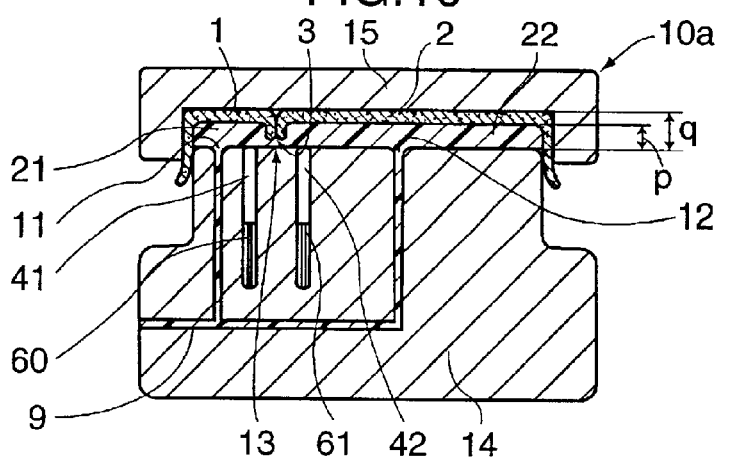
FIG. 10 is a third schematic sectional view showing the example of the mold according to the first embodiment.
Figure 11:
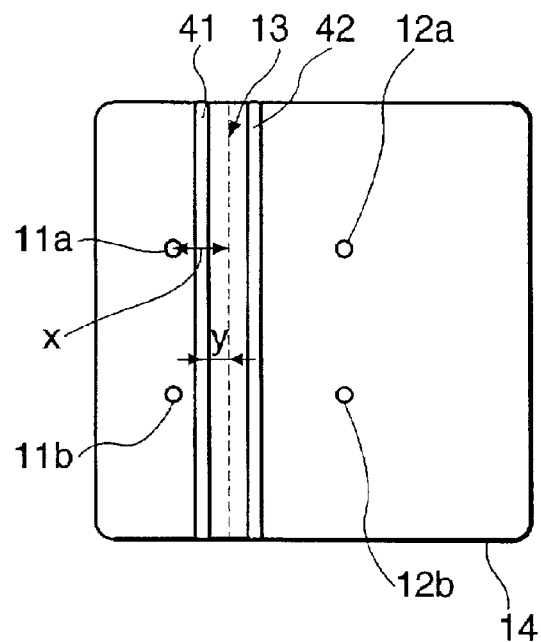
FIG. 11 is a schematic plan view showing an example of a molding surface of a male mold part used in the first embodiment.
Figure 12:
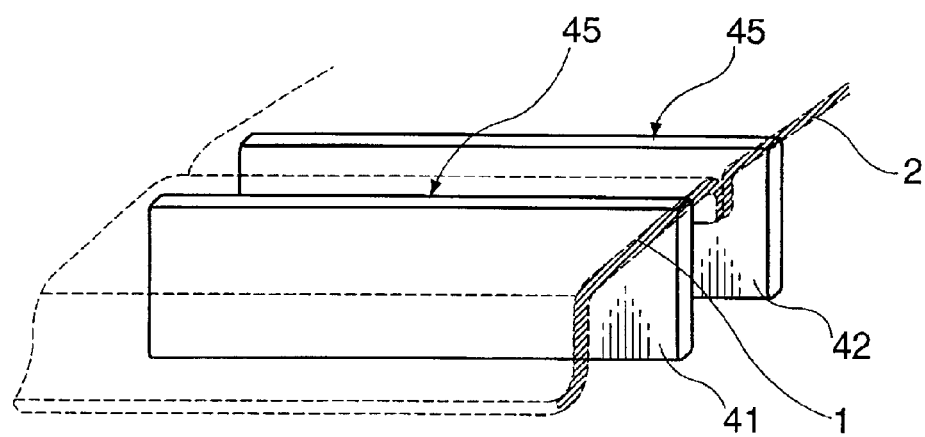
FIG. 12 is a schematic perspective view showing an example of resin blocking plates (resin blocking members) used in the first embodiment.

An example in which resin blocking plates are used as resin blocking members is described in the first embodiment. FIGS. 8 to 10 are schematic sectional views showing a mold according to the first embodiment and an example of a method for producing a molded object using such a mold; FIG. 11 is a plan view of a molding surface (mold surface) of a male mold part 14; and FIG. 12 is a schematic perspective view of the resin blocking plates used in the mold when viewed sideways. If the above mold is used, a multilayer and multiface molded article shown in FIGS. 1 and 2 can be produced.

Specifically, a mold 10a shown in FIGS. 8 to 11 is adapted to produce a multilayer molded article (multilayer and multiface molded article) by supplying a molten (fluid) thermoplastic resin to the rear side of a first skin material 1 and a second skin material 2 adjacent to each other on the same plane in order to adhere the skin materials and the thermoplastic resin to each other. It should be noted that an area of the second skin material 2 is larger than that of the first skin material 1. The skin materials 1 and 2 are joined beforehand at a boundary portion (joined edge portion) 3 and, in this example, are adhered to each other by an adhesive.

The mold 10a is comprised of the male mold part 14 and a female mold part 15 for molding the thermoplastic resin by being paired. First gates (resin supply openings) 11a, 11b for supplying the molten resin to the rear side of the first skin material 1 and second gates (resin supply openings) 12a, 12b for supplying the molten resin to the rear side of the second skin material 2 are formed in the molding surface of the male mold part 14. A distance between the first gates 11a, 11b and a position 13 corresponding to (facing) the boundary portion 3 (hereinafter the position 13 may also be referred to as "planned boundary position" or "planned boundary line") is shorter than that between the second gates 12a, 12b and the planned boundary position 13. Resin blocking plates 41, 42 are so embedded in the molding surface of the male mold part as to be projectable in order to control flows of the molten resin coming out from the first gates 11 and the second gates 12 toward the boundary portion 3 between the first and second skin materials 1 and 2 (or the planned boundary position 13 on the molding surface of the male mold part 14 corresponding to the boundary portion 3).

More specifically, the resin blocking plates 41, 42 are arranged substantially along the planned boundary position 13 at the both sides of the planned boundary position (planned boundary line) 13. These resin blocking plates 41, 42 are connected with a cylinder (not shown) via movable members (shafts in this example) 60, 61, and capable of moving forward (upward in this embodiment) to be projected from the molding surface while moving backward (downward in this embodiment) to be withdrawn in the male mold part 14 as the movable members 60, 61 are moved. One (first resin blocking plate 41) of these resin blocking plates 41, 42 is capable of controlling a flow of the resin from the first gate 11 toward the boundary portion 3 (or the planned boundary position 13), whereas the other resin blocking plate (i.e. the second resin blocking plate) 42 is capable of controlling a flow of the resin from the second gate 12 toward the boundary portion 3 (or the planned boundary position 13). Further, as shown in FIG. 12, upper surfaces 45 of the resin blocking plates 41, 42 are shaped in conformity with the shape of the molded object (i.e. the shape of the skin materials 1, 2). Since the molded object has a flat shape in this example, the upper surfaces 45 of the resin blocking plates 41, 42 are also flat. Thus, the resin can be substantially completely stopped.

When the mold 10a as above is used, the multilayer and multiface molded article can be produced as described below. FIGS. 8 to 10 show an example of a producing method. Specifically, in this example, the mold 10a is largely opened to form a space larger than a space corresponding to the molded object as shown in FIG. 8, and the skin materials 1 and 2 are placed in the mold 10a with the rear surfaces thereof faced toward the male mold part 14. While the resin blocking plates 41, 42 are projecting into a mold cavity, a molten thermoplastic resin is supplied to the rear side of the skin material 1 from the first gates 11a, 11b and also to the rear side of the skin material 2 from the second gates 12a, 12b.

In this example, the female mold part 15 is moved toward the male mold part 14 (i.e. clamping is started) after the supply of the molten thermoplastic resin, and the molten thermoplastic resin is filled at the rear sides of the skin materials while being pressed (see FIG. 9). While the molten thermoplastic resin is filled, the resin blocking plates 41, 42 are projecting from the molding surface and are in abutment against the female mold part 15 via the skin materials 1, 2. If the molten thermoplastic resin is filled without projecting the resin blocking plates 41, 42, resin 21 supplied from the first gates 11a, 11b closer to the boundary portion 3 reaches the boundary portion 3 earlier than resin 22 supplied from the second gates 12a, 12b more distant from the boundary portion 3, thereby making it likely for the boundary portion 3 to be largely displaced. Contrary to this, in the first embodiment, the resin blocking plates 41, 42 are projected into the mold cavity, and the molten thermoplastic resin is filled with the resin blocking plates 41, 42 held in abutment against the female mold part 15 via the skin materials 1, 2. Thus, arrival timings of the resins 21, 22 at the boundary portion 3 can be controlled. More specifically, the arrival timing of the resin 21 supplied from the first gates 11a, 11b closer to the boundary portion 3 is delayed since the resin 21 is blocked by the first resin blocking plate 41. Thus, the arrival timing of the resin 21 and the arrival timing of the resin 22 supplied from the second gates 12a, 12b can be adjusted to substantially match, with the result that the displacement of the boundary portion 3 can be prevented.

Further, in this example, the resin 22 supplied from the second gates 12a, 12b more distant from the boundary portion 3 is also blocked by the second resin blocking plate 42. Thus, the arrival timings of the resins 21, 22 at the boundary portion 3 can be easily controlled by adjusting the lowering timings of the first and second resin blocking plates 41, 42.

Further, in this example, the withdrawal of the resin blocking plates 41, 42 had been completed (see FIG. 10) before the female mold part 15 is more moved in a clamping direction than at a stage shown in FIG. 9 to make a clearance between the male mold part 14 and the female 15 substantially equal to thickness q (see FIG. 2) of the molded object and to make the height of the base member 4 made of the thermoplastic resin substantially equal to the thickness p of the base member 4 (see FIG. 2) (i.e. before the clamping is completed). The start of the withdrawal (lowering in this example) of the resin blocking plates 41, 42 is desirably completed before the clamping is completed. For example, it is desirable to start the withdrawal (lowering) when the molten resin is substantially fully filled outside (outside when a side where the boundary portion 3 is located is an inner side) the resin blocking plates 41, 42.

Figure 1:
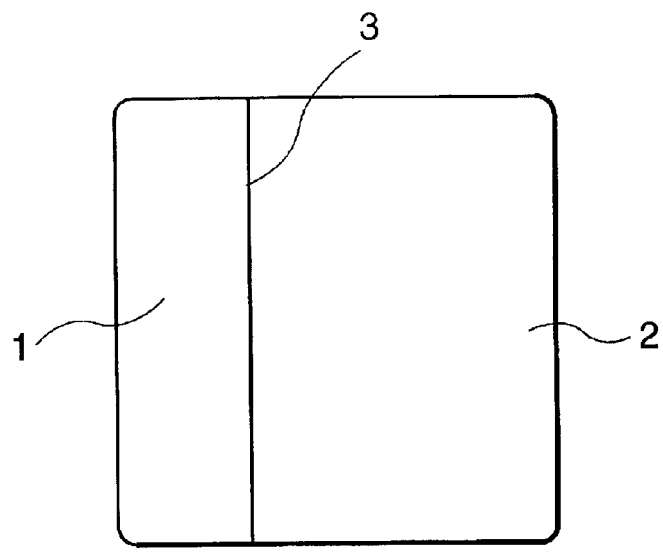
FIG. 1 is a schematic plan view (top view) showing an example of a molded object producible by the present invention.
Figure 2:
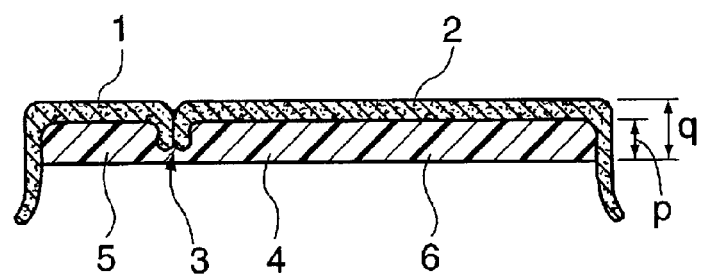
FIG. 2 is a schematic sectional view of the molded object of FIG. 1 when viewed from front.
Figure 3:
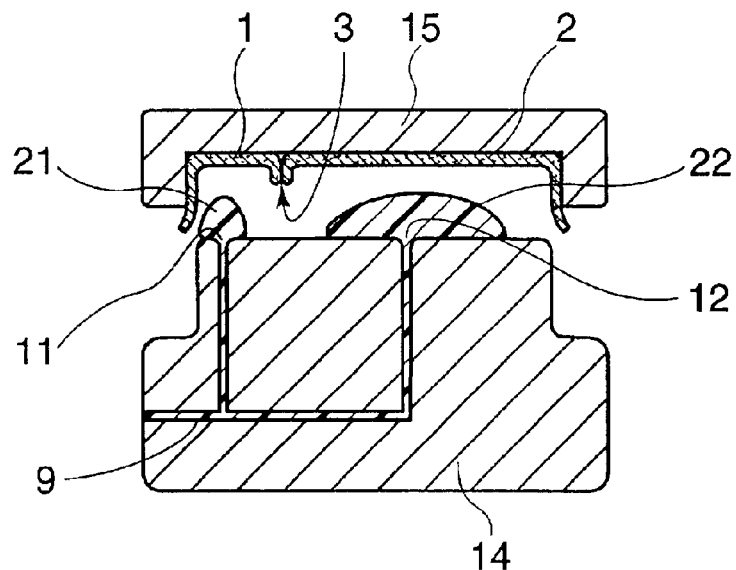
FIG. 3 is a first schematic sectional view showing an example of a prior art mold.
Figure 4:
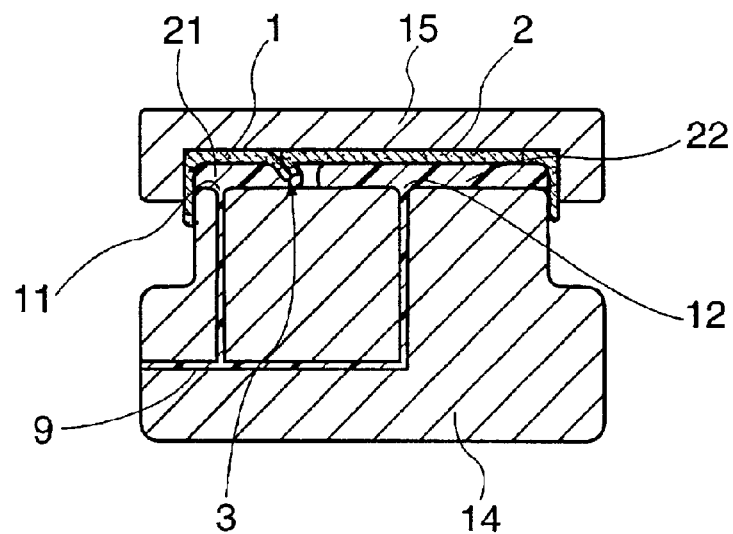
FIG. 4 is a second schematic sectional view showing the example of the prior art mold.
Figure 5:
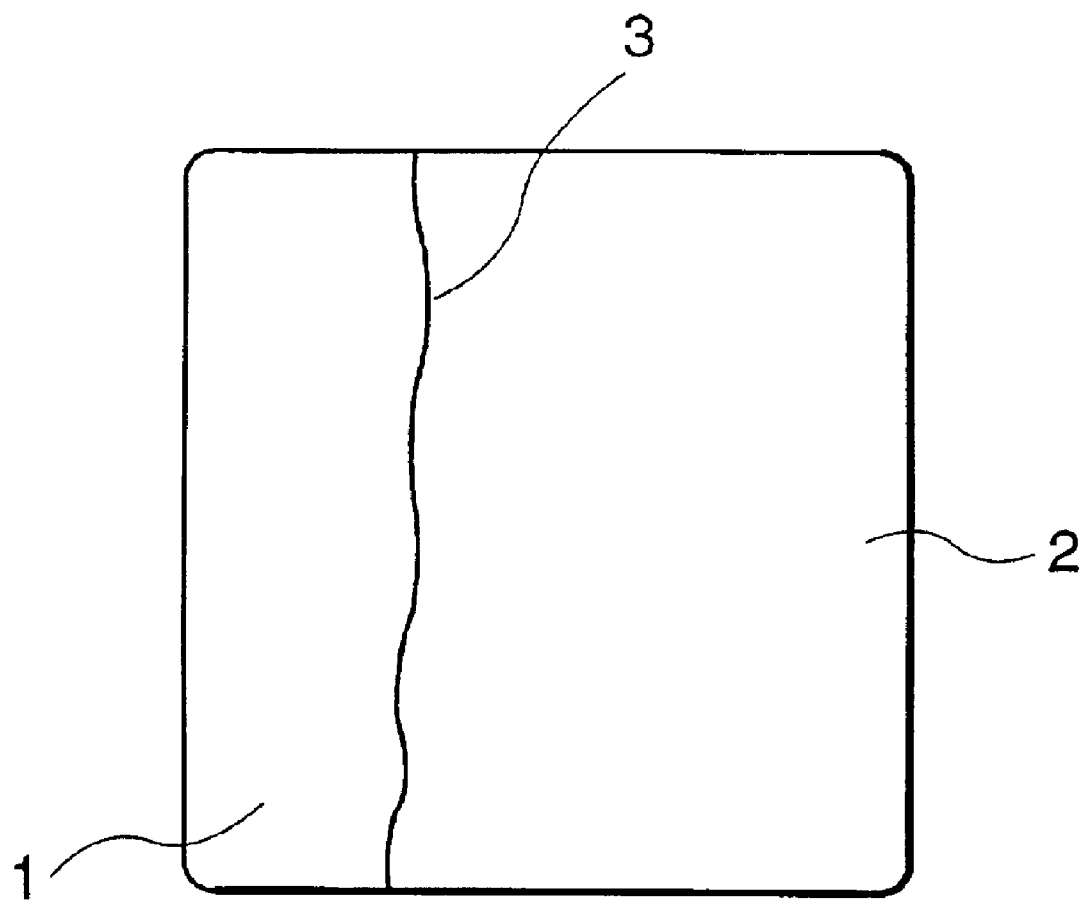
FIG. 5 is a schematic plan view of a molded object produced by the prior art mold.
Figure 6:
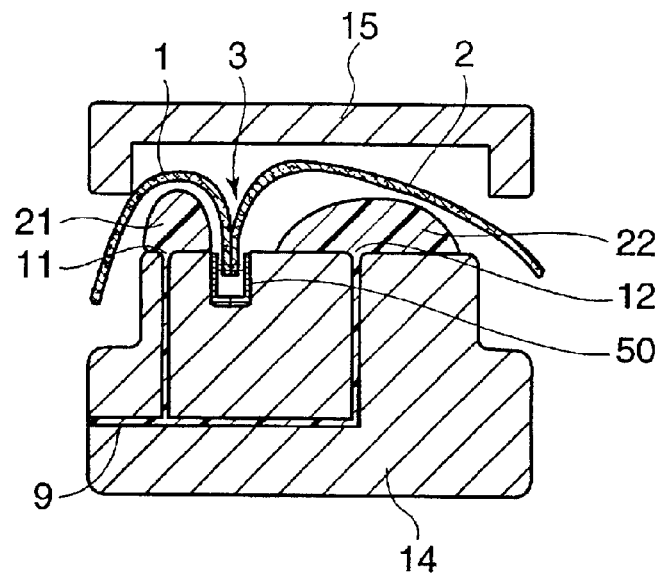
FIG. 6 is a first schematic sectional view showing another example of the prior art mold.
Figure 7:
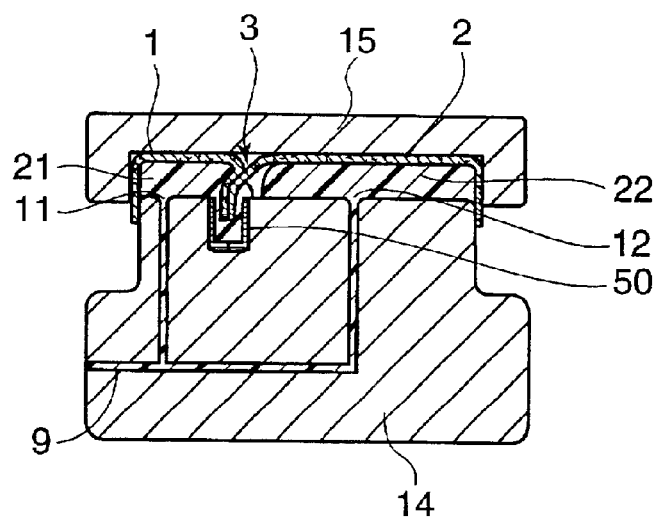
FIG. 7 is a second schematic sectional view showing the another example of the prior art mold.

After the completion of clamping shown in FIG. 10, the resin is cooled and solidified, and the molded object free from displacement and wrinkling at the boundary portion 3 as shown in FIGS. 1 and 2 can be obtained by opening the mold 10a.

Although the planned boundary position (planned boundary line) 13 is shown in broken line on the molding surface of the male mold part 14 in the shown example (see FIG. 11), this broken line is drawn in order to facilitate the description by clarifying the planned boundary position and is not actually drawn on the molding surface of the male mold part 14. This also applied to shown examples to be described later.

The skin materials 1 and 2 can be joined by various methods which, for example, include chemical bonding methods (bonding using an adhesive or by heat sealing) and methods using devices (sewing with a thread; fixing by needles, pins or staples; fixing by a holding member).

Before being placed in the mold 10a, the skin materials 1, 2 may be shaped (preliminary shaping) in conformity with the shape of the molded object (i.e. the shape of the female mold part 15) as shown in FIG. 8. However, they may not be shaped beforehand. Particularly in the case that a holding member to be described below is used, the skin materials 1, 2 are often not shaped beforehand.

Figure 13:
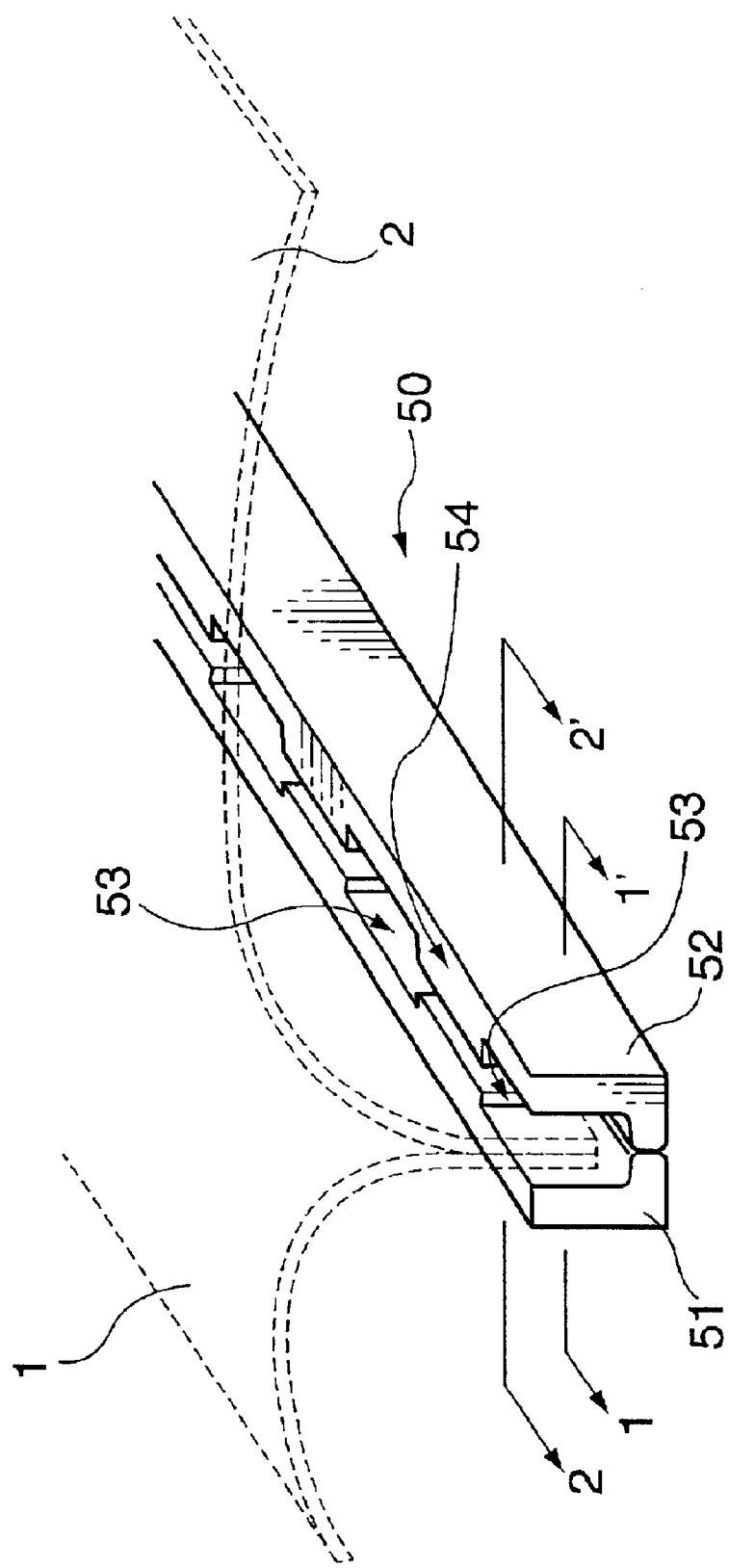
FIG. 13 is a schematic perspective view showing a holding member used in the first embodiment.
Figure 14:
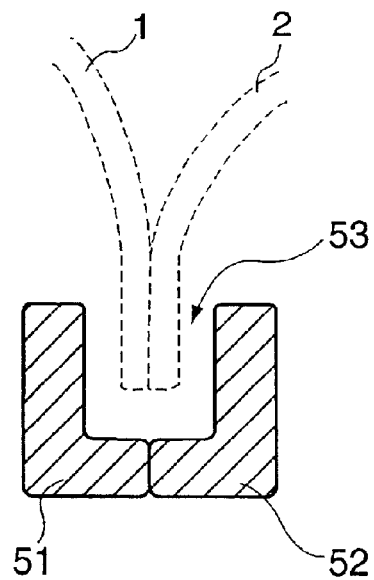
FIG. 14 is a schematic sectional view of the holding member of FIG. 13 along 1–1'.
Figure 15:
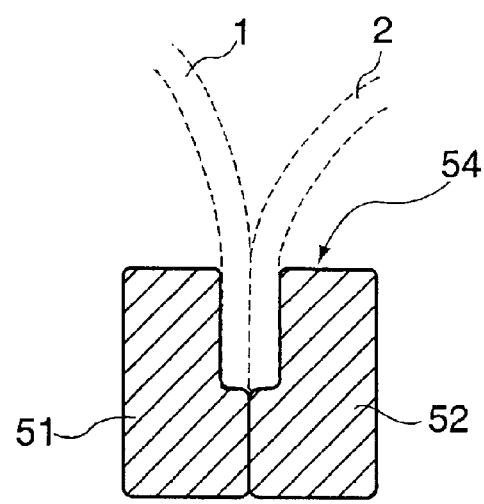
FIG. 15 is a schematic sectional view of the holding member of FIG. 13 along 2–2'.

FIG. 13 is a schematic perspective view showing an example of the holding member, FIG. 14 is a sectional view of the holding member of FIG. 13 along 1–1', and FIG. 15 is a sectional view of the holding member of FIG. 13 along 2–2'. A holding member 50 is comprised of a pair of holding pieces 51, 52 symmetrical with respect to the skin materials 1, 2 to be tightly held thereby (i.e. with respect to the boundary portion of the skin materials 1, 2). Each of the holding pieces 51, 52 includes a holding portion 54 for holding the skin materials 1, 2 and a recess 53 for accommodating a molten resin to bond the skin materials 1, 2 and the resin to each other.

Figure 16:
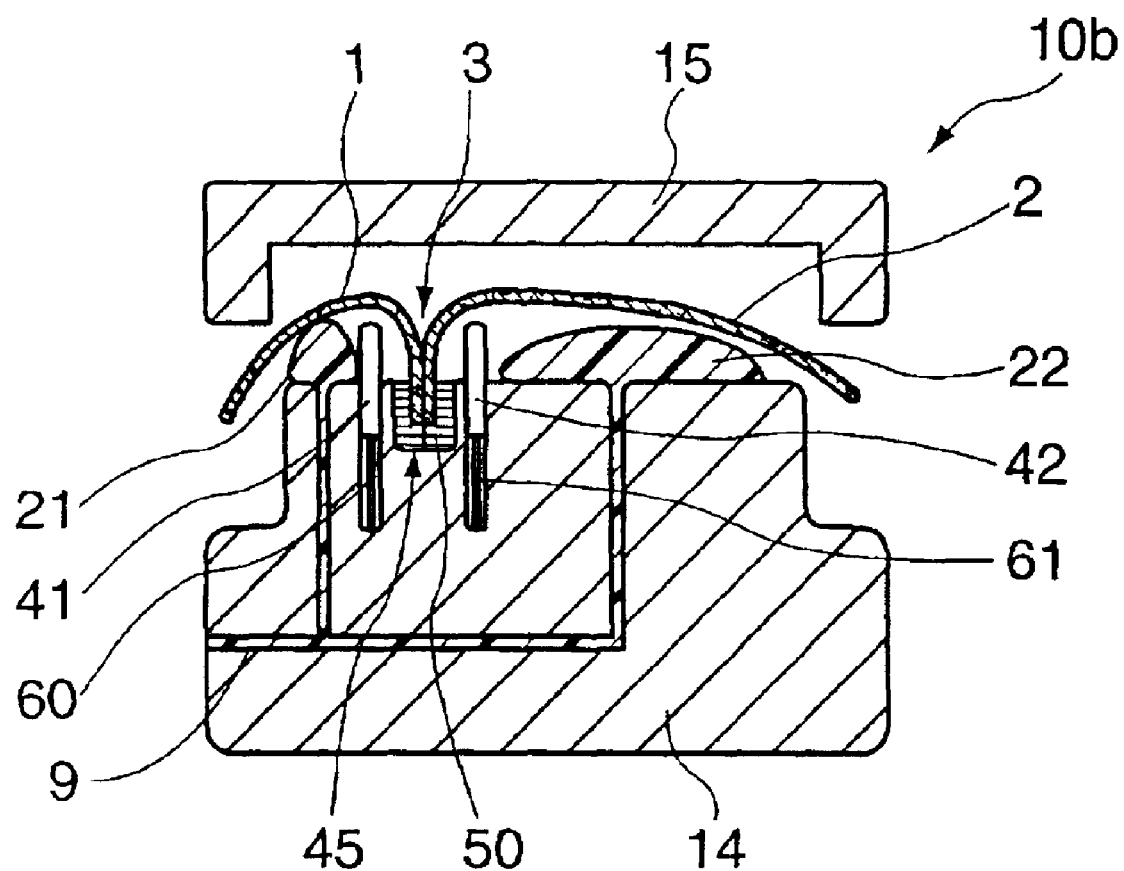
FIG. 16 is a schematic sectional view showing another example of the mold according to the first embodiment.

FIG. 16 is a schematic sectional view of a mold 10b using the holding member 50. This mold 10b is similar to the mold 10a shown in FIGS. 8 to 10 except that the molding member 50 is embedded in the molding surface of the male mold part 14. The holding member 50 is embedded at a location corresponding to the boundary portion 3 of the skin materials 1, 2 (i.e. a location corresponding to planned boundary position). Even if such a mold 10b is used, a multilayer and multiface molded article can be produced by being molded as in the case shown in FIGS. 8 to 10. When the mold 10b is opened to take the molded object out, the holding member 50 may also be taken out from the molded object. Since the resin having entered the recess 53 of the holding member 50 is solidified while being in contact with both the first and second skin materials 1, 2, there is no possibility of separating the skin materials 1, 2 even if the holding member 50 is taken out.

It should be noted that the holding member 50 may be provided with through holes for pins as in a holding member 70a as a resin blocking member to be described later, and the holding pieces 51, 52 may be asymmetric.

Although the resin blocking plates are desirably provided at the both sides of the planned boundary position (planned boundary line) 13 in the first embodiment, they may be provided only at one side. In the case of providing the resin blocking plate only at one side, the resin blocking plate is often provided at the side where the gates closer to the boundary portion (i.e. gates 11 for supplying the resin to the skin material 1 having a smaller area in the above shown examples) are formed. Even with such an arrangement, the arrival timings of the resins at the boundary portion can be controlled by withdrawing the resin blocking plate in accordance with the arrival timing of the resin (resin 22 supplied from the gates 12 in the above shown examples) supplied from the gates more distant from the boundary portion.

The resin blocking plate is desirably provided near the planned boundary line, and distance y between the resin blocking plate and the planned boundary line (see FIG. 11) is, for example, 50 or shorter, preferably 40 or shorter, more preferably 30 or shorter when distance x between the gate and the planned boundary line (see FIG. 11) is 100. In the case of providing the resin blocking plates at the both sides of the planned boundary position, the resin blocking plates at the both sides are preferably substantially equidistant from the planned boundary position.

Figure 17:
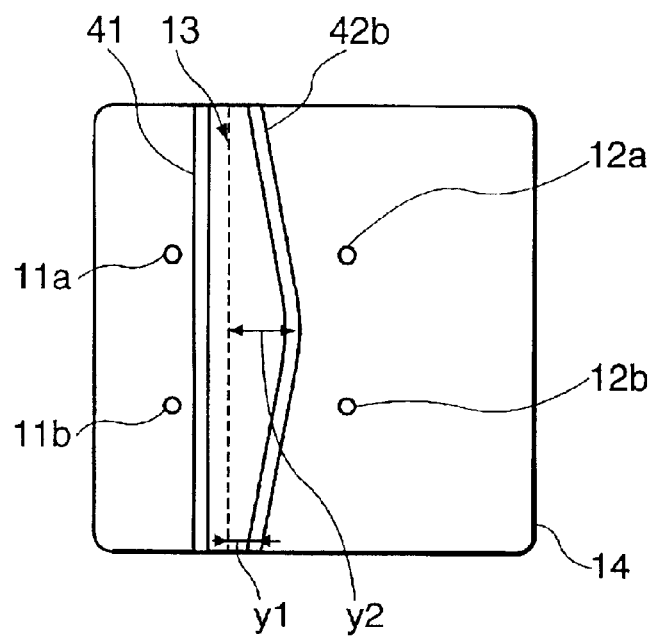
FIG. 17 is a schematic plan view showing another example of the molding surface of the male mold part used in the first embodiment.

Further, the resin blocking plate may be slightly different from the shape of the boundary planned line as long as it extends substantially along the planned boundary line and, for example, may possess portions close to and distant from the planned boundary line. FIG. 17 is a plan view of the molding surface of the male mold part 14 using such resin blocking plates. In FIG. 17, one resin blocking plate 42b (at the side of the second gates 12a, 12b) is slightly different from the shape of the planned boundary line 13.

A longest distance y2 to the planned boundary line is, for example, at most three times, preferably at most two times, more preferably one and half times as long as a shortest distance y1 to the planned boundary line.

Figure 18:
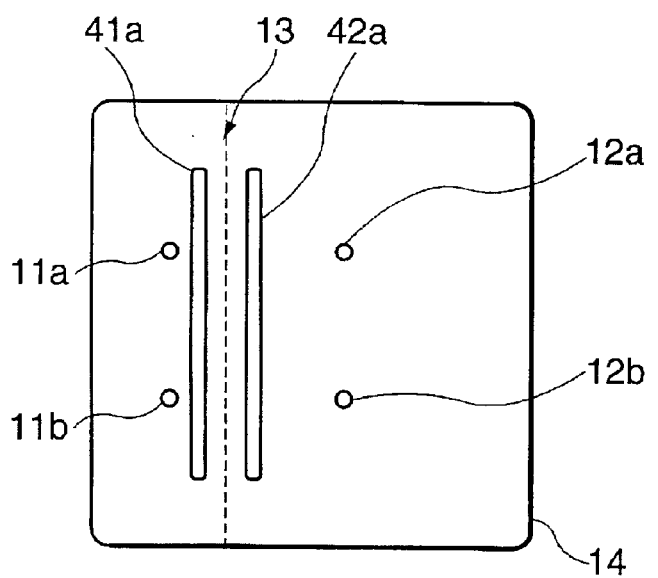
FIG. 18 is a schematic plan view showing still another example of the molding surface of the male mold part used in the first embodiment.
Figure 19:
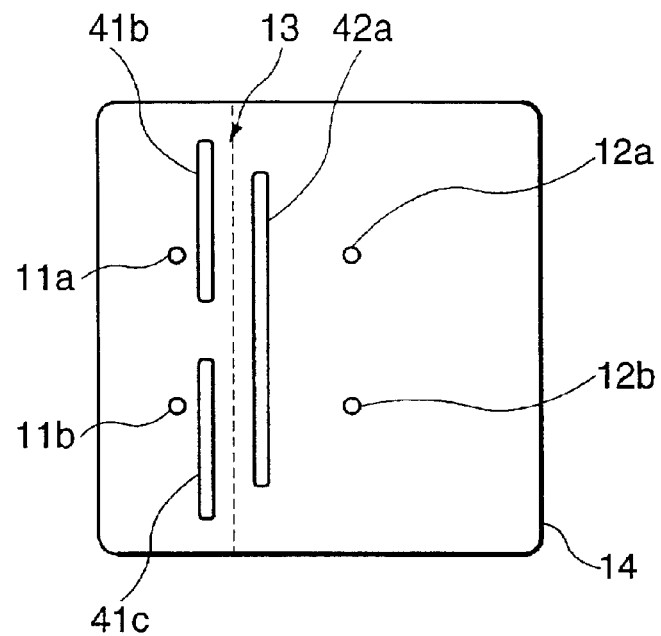
FIG. 19 is a schematic plan view showing other example of the molding surface of the male mold part used in the first embodiment.
Figure 20:
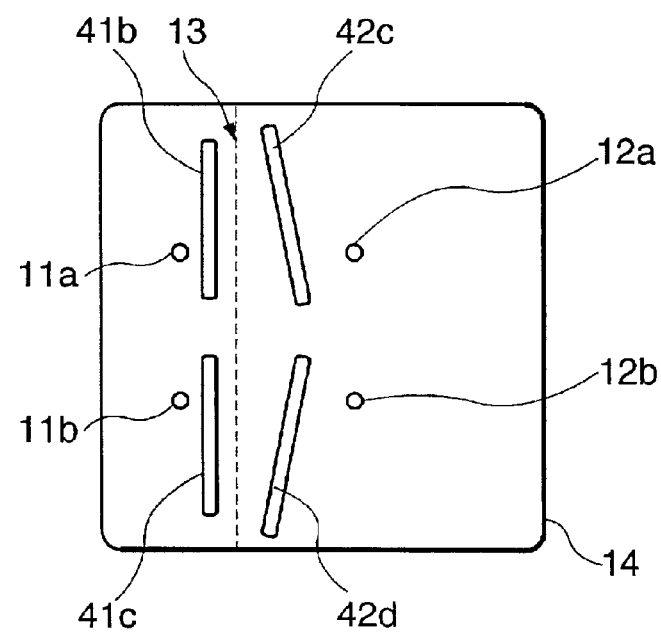
FIG. 20 is a schematic plan view showing still other example of the molding surface of the male mold part used in the first embodiment.

The resin blocking plate may have a length shorter than the entire length of the planned boundary line provided that it can control the arrival timing of the resin. Further, the number of the resin blocking plates provided at one side of the planned boundary position (planned boundary line) may be one or more. FIG. 18 is a plan view showing an example of the mold 14 using shorter resin blocking plates, and FIGS. 19, 20 are plan views showing examples of the male mold part 14 using a plurality of resin blocking plates at one side. In the example of FIG. 18, resin blocking plates 41a, 42a shorter than the planned boundary line 13 are provided at the both sides of the planned boundary line 13. In the example of FIG. 19, one resin blocking plate 42a slightly shorter than the planned boundary line 13 is provided at one side (side of the second gates 12a, 12b in this example) and two resin blocking plates 41b, 41c each having a length shorter than half the length of the planned boundary line 13 are provided at the other side (side of the first gates 11a, 11b in this example). Further, in the example of FIG. 20, two resin blocking plates 41b, 41c, 42c, 42d are provided at either side of the planned boundary line 13 (a total of four resin blocking plates), wherein the resin blocking plates 42c, 42d at one side (side of the second gates 12a, 12b in this example) are provided nearly but not-perfectly along the planned boundary line 13.

The length of the resin blocking plate (a total length in the case that a plurality of resin blocking plates are used at one side) is, for example, 20% or more, preferably 50% or more, more preferably 80% or more of the entire length of the planned boundary line 13. An upper limit of the length of the resin blocking plate is normally 100% or less of the entire length of the planned boundary line 13. However, the length of the resin blocking plate may be slightly longer than the entire length of the planned boundary line 13 in the case that the resin blocking plate is provided not-perfectly along the planned boundary line 13. In such a case, an upper limit of the length of the resin blocking plate is, for example, 120% or less (preferably 110% or less) of the entire length of the planned boundary line 13.

Figure 21A:
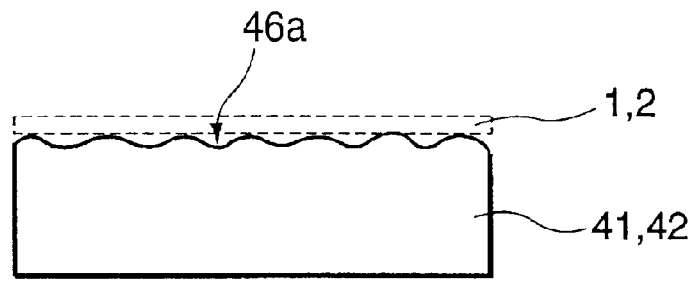
FIGS. 21A, 21B and 21C are schematic side views showing other examples of the resin blocking plates (resin blocking members) used in the first embodiment.
Figure 21B:
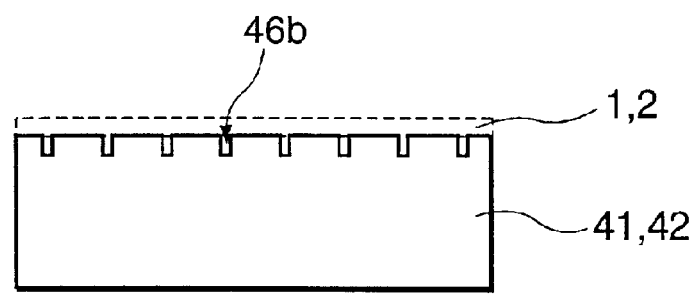
Figure 21C:
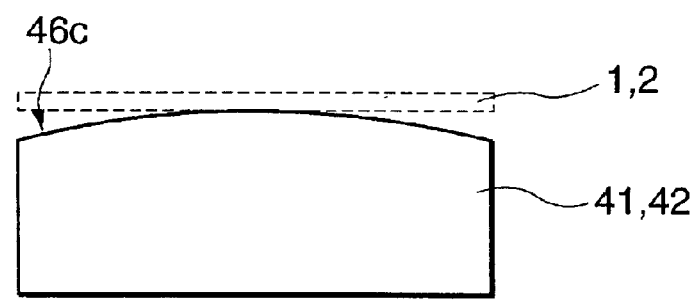

Although the resin blocking plate may be of the type that can completely block the flow of the resin (complete sealing type) as shown in FIG. 12, it may be of such a type that the resin leaks through (incomplete sealing type) as long as the deformation of the boundary portion 3 can be prevented by blocking the resin. FIGS. 21A to 21C are schematic side views showing various examples of the resin blocking plates of the incomplete sealing type. For example, the upper surfaces of the resin blocking plates 41, 42 may be made wavy to form resin leaking clearances 46a as shown in FIG. 21A; slit-shaped clearances 46b may be formed in the upper surfaces of the resin blocking plates 41, 42 as shown in FIG. 21B; and the upper surfaces of the resin blocking plates 41, 42 may be convexedly curved to form resin leaking clearances 46c as shown in FIG. 21C. In the case of using a plurality of resin blocking plates, it is not necessary to use the resin blocking plates of the same shape and the resin blocking plates selected from the complete sealing type ones and the incomplete sealing type ones may be used while being suitably combined.

Although the projecting height of the resin blocking plate from the molding surface is not particularly restricted as long as the resin blocking plate can control the flow of the resin, it is, for example, 20% or more, preferably 50% or more, more preferably 80% or more of the thickness p of the base member 4 (see FIG. 2). An upper limit of the projecting height may be suitably selected according to the molding method (press molding described above and injection molding described later), and is 100% or less of the thickness p in the case of injection molding. On the other hand, since the resin is supplied with the male and female mold parts opened in the case of press molding, the projecting height may be such as to prevent the supplied resin from reaching the boundary portion and is suitably determined by the shape of a product and the arrangement of the gates.

Second Embodiment

Figure 26:
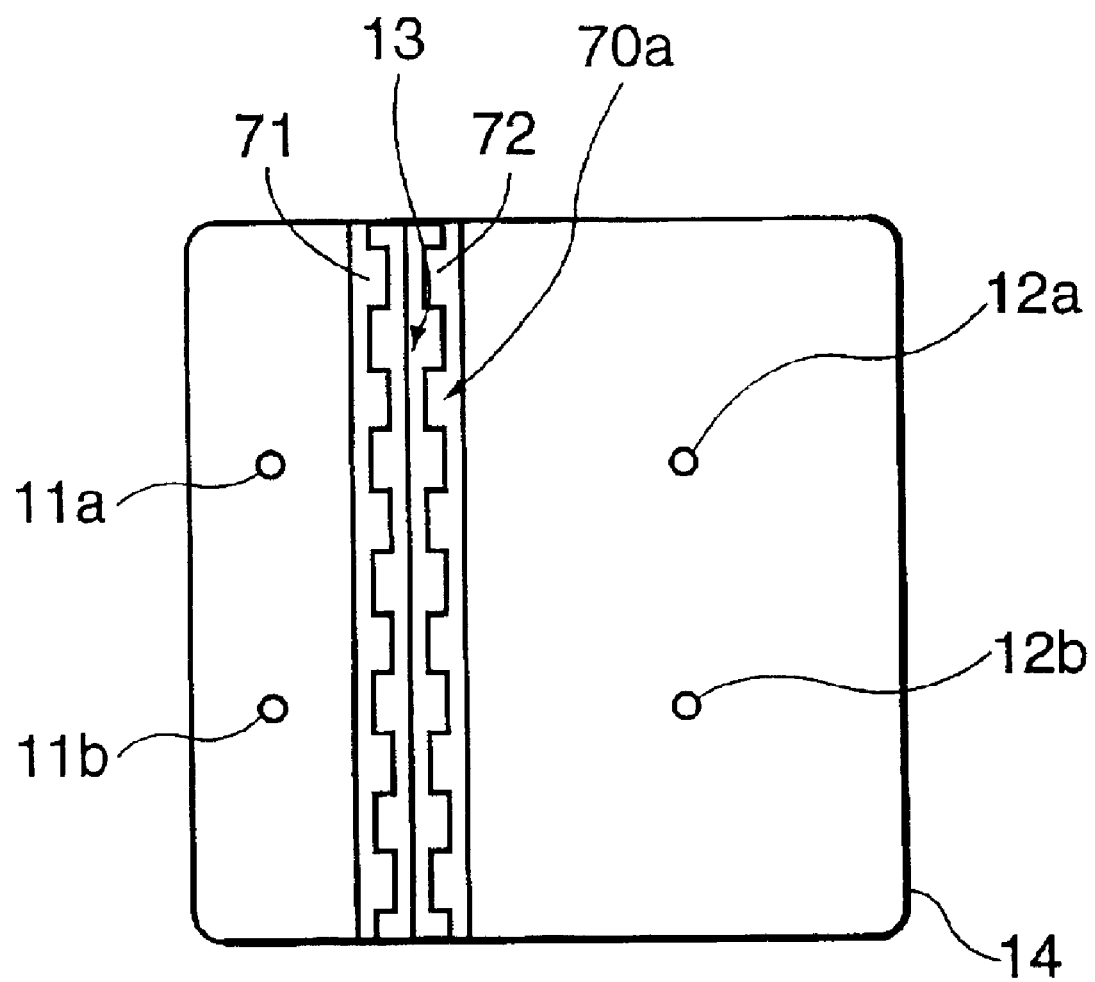
FIG. 26 is a schematic plan view showing a molding surface of a male mold part of the mold shown in FIGS. 22 to 25.
Figure 27:
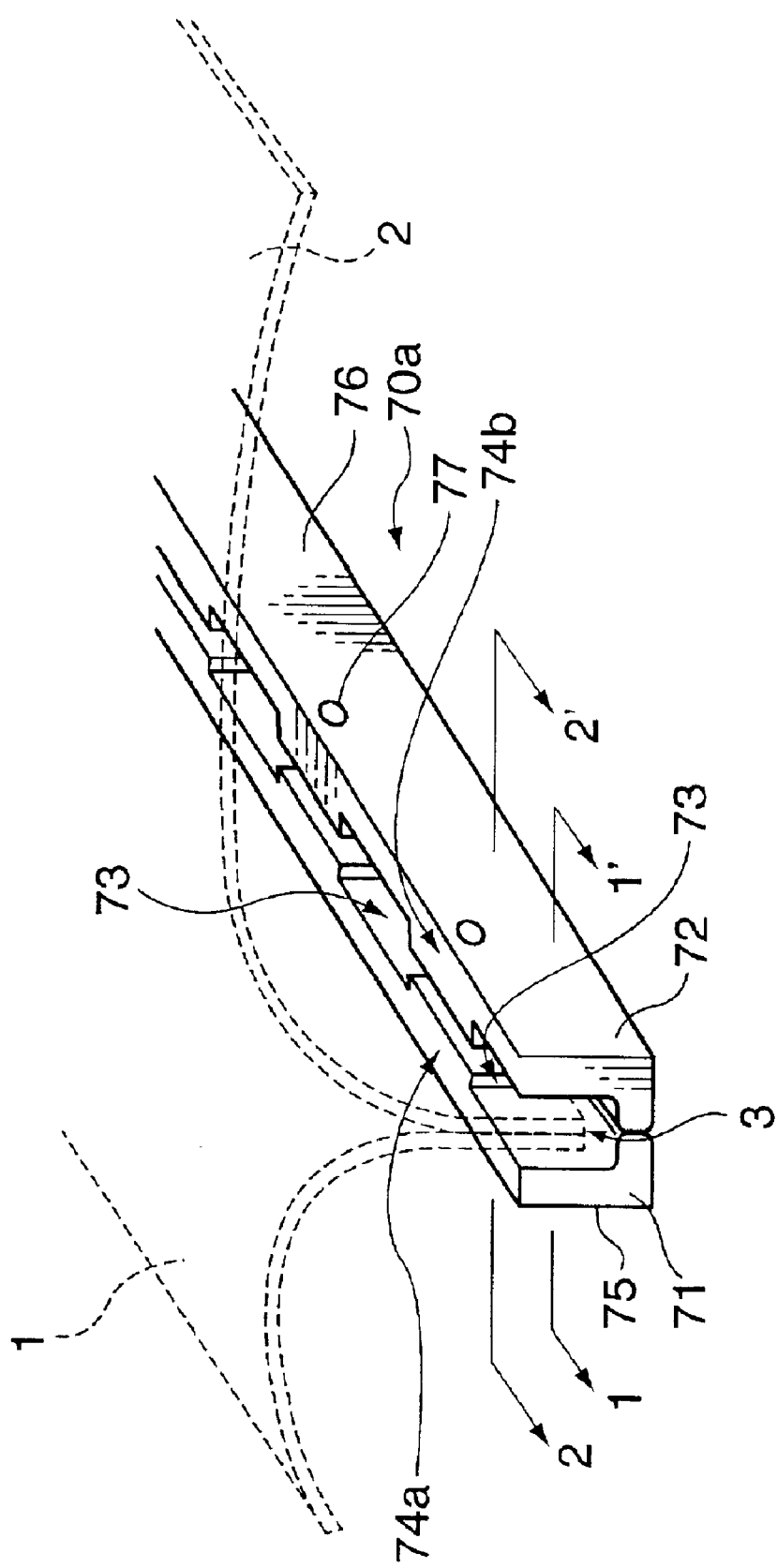
FIG. 27 is a schematic perspective view of a holding member (resin blocking member) used in the mold shown in FIGS. 22 and 23.
Figure 28:
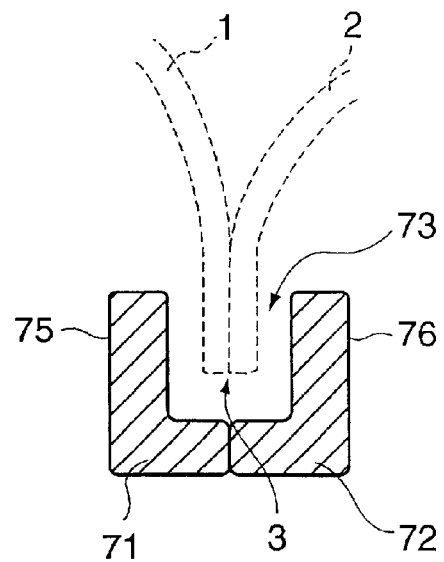
FIG. 28 is a sectional view of the holding member of FIG. 27 along 1–1'.

An example in which a holding member is used as a resin blocking member is described in the second embodiment. FIGS. 22 to 25 are schematic sectional views showing a mold according to the second embodiment and an example of a producing method using such a mold; FIG. 26 is a plan view showing a molding surface of a male mold part of this mold; FIG. 27 is a schematic perspective view of a resin blocking member (holding member) used in this mold; FIG. 28 is a sectional view of the holding member along 1–1'; and FIG. 29 is a sectional view of the holding member along 2–2'.

A mold 10c shown in FIGS. 22 to 26 is comprised of a pair of a male mold part 14 and a female mold part 15 for molding a thermoplastic resin. First gates (resin supply openings) 11a, 11b for supplying a molten resin to the rear side of a first skin material 1 and second gates (resin supply openings) 12a, 12b for supplying a molten resin to the rear side of a second skin material 2 are formed in a molding surface of the male mold part 14. A holding member 70a as a resin blocking member is embedded in the molding surface of the male mold part 14 at a position (i.e. planned boundary position or planned boundary line) 13 corresponding to a boundary portion 3 between the first and second skin materials 1, 2 in order to refrain flows of the molten resins coming out from the first gates 11 and the second gates 12 toward the boundary portion 3. This holding member 70a is supported on a movable means (shaft in this example) 62 connected with a cylinder (not shown) and is projectable from the male mold part 14.

Figure 29:
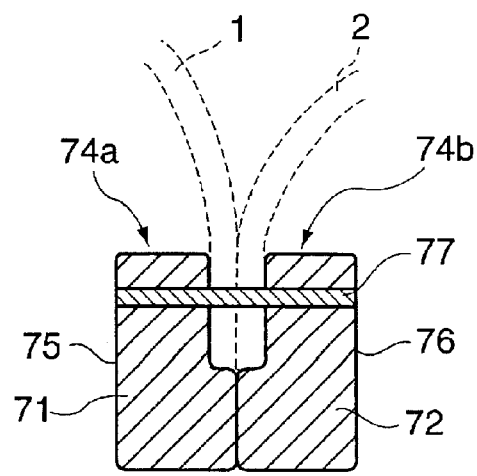
FIG. 29 is a sectional view of the holding member of FIG. 27 along 2–2'.

More specifically, as shown in FIGS. 27 to 29, the holding member 70a is comprised of a pair of holding pieces 71, 72 symmetrical with respect to the skin materials 1, 2 tightly held thereby, and the holding pieces 71, 72 include not only holding portions 74a, 74b for tightly holding the skin materials 1, 2, from the rear side at the boundary portion 3 and a resin accommodating portion 73 for accommodating the molten resin to bond it to the skin materials 1, 2 at the boundary portion 3, but also side walls (resin blocking walls) 75, 76 for temporarily blocking the flows of the molten resins toward the resin accommodating portion 73. Specifically, the boundary portion 3 is got between rising side walls 75, 76, and the entrance of the resins from the first and second gates 11, 12 into the resin accommodating portion 73 (i.e. boundary portion 3) can be prevented using the side walls 75, 76 by projecting the holding member 70a from the male mold part 14. In the holding member 70a, pins 77 are pierced through the holding portions 74a, 74b and the skin materials 1, 2 to prevent the disengagement of the skin materials 1, 2 from the holding portions 74a, 74b. The holding member 70a is detachable from the male mold part 14. The shape of the holding member 70a is not particularly restricted as long as the skin materials 1, 2 can be tightly held by the holding portions 74a, 74b, the skin materials 1, 2 and the resin can be bonded to each other in the resin accommodating portion 73, and the flows of the molten resins toward the resin accommodating portion 73 can be temporarily blocked by the side walls 75, 76. For example, the holding pieces 71, 72 may be asymmetric. On the other hand, the holding portions 74a, 74b which are part of the holding pieces 71, 72 are desirably substantially symmetric. For example, they may be completely symmetric or may be symmetric except minor differences (e.g. narrow grooves are formed in one holding portion for the anti-slip purpose, and such grooves are not formed at the other holding portion).

Figure 22:
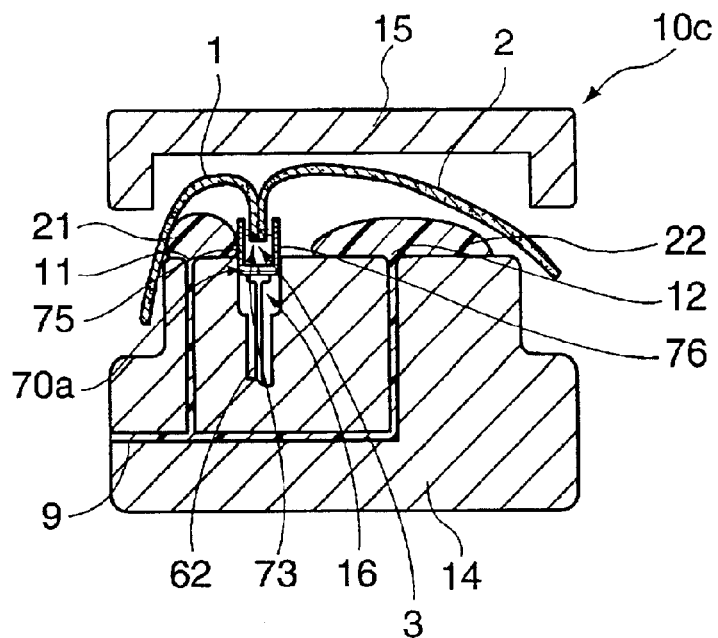
FIG. 22 is a first schematic sectional view showing an example of a mold according to a second embodiment.
Figure 23:
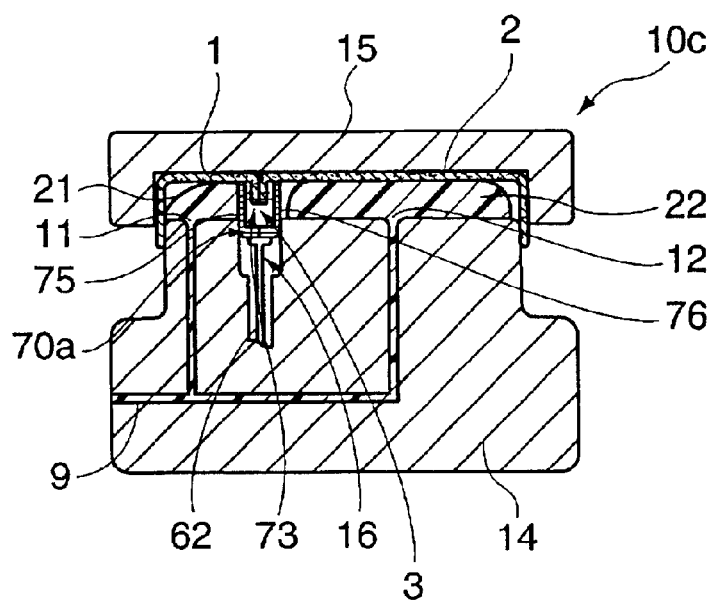
FIG. 23 is a second schematic sectional view showing the example of the mold according to the second embodiment.

When the mold 10c as above is used, a multilayer and multiface molded article as described below can be produced. Specifically, as shown in FIG. 22, after the boundary portion 3 of the first and second skin materials 1, 2 is tightly held by the holding member 70a with the rear surfaces of the first and second skin materials 1, 2 adjacent to each other on the same plane faced toward the male mold part 14, the holding member 70a is withdrawn into a holding-member-accommodating-portion 16 of the male mold part 14 and raised by the shaft 62 standing in this accommodating portion 16, thereby projecting the holding member 70a into the mold cavity. Further, the mold 10c is largely opened to form a space larger than the one corresponding to the molded object. A molten thermoplastic resin 21 is supplied to the rear side of the skin material 1 from the first gates 11a, 11b and a molten thermoplastic resin 22 is supplied to the rear side of the skin material 2 from the second gates 12a, 12b.

The female mold part 15 is moved toward the male mold part 14 (i.e. clamping is started) after the supply of the molten thermoplastic resins 21, 22, and the molten thermoplastic resins 21, 22 are filled into the mold cavity while being pressed. While the molten thermoplastic resins 21, 22 are being filled, the entrance of the resins 21, 22 into the resin accommodating portion 73 can be prevented by the side walls 75, 76 of the holding member 70a since the holding member 70a is projecting from the molding surface.

Figure 24:
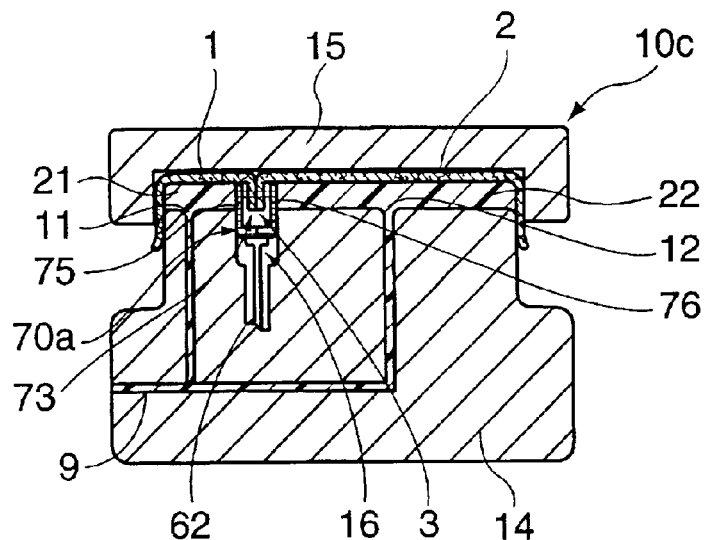
FIG. 24 is a third schematic sectional view showing the example of the mold according to the second embodiment.

Further, in this embodiment, after the holding member 70a is brought into abutment against the molding surface of the female mold part 15 via the skin materials 1, 2 by moving the female mold part 15 in a clamping direction (see FIG. 23), the female mold part 15 is brought further closer while keeping this abutted (pressed) state and the holding member 70a is withdrawn in the male mold part 14 (see FIG. 24). In other words, the entrance of the molten resins 21, 22 into clearances between the boundary portion 3 and the side walls 75, 76 is blocked by the skin materials 1, 2, while the molten resins 21, 22 are filled into the mold cavity by clamping the mold 10c.

When the molten resins are substantially filled outside (outside when a side where the boundary portion 3 is located is an inner side) of the side walls 75, 76, clearances are formed between the rear surfaces of the skin materials 1, 2 and the upper surface (molding surface) of the holding member 70a by setting an withdrawing (lowering) speed of the holding member 70a faster than an approaching speed of the female mold part 15, whereby the resins 21, 22 are caused to enter the resin accommodating portion 73 (and the boundary portion 3) through these clearances. In this way, the arrival timings of the resins 21, 22 at the boundary portion 3 can be adjusted to substantially match, thereby preventing a displacement of the boundary portion 3.

The withdrawal (retraction) of the holding member 70a had been completed (see FIG. 25), before a clearance between the male mold part 14 and the female 15 becomes substantially equal to the thickness q (see FIG. 2) of the molded object and the height of the base member 4 made of the thermoplastic resin becomes substantially equal to the thickness p of the base member 4 (see FIG. 2) (i.e. before the clamping is completed). After the completion of the clamping, the resins are cooled and solidified, and a molded object, as shown in FIGS. 1 and 2, which is free from the displacement of the boundary portion 3 and wrinkling can be obtained by opening the mold 10c.

In the second embodiment as well, before being held by the holding member 70a and placed in the mold 10c, the skin materials 1, 2 may be shaped (preliminary shaping) in conformity with the shape of the molded object (i.e. the shape of the female mold part 15) as in the first embodiment.

Further, in addition to holding by the holding member 70a, the skin materials 1 and 2 may be held, if necessary, by an other method such as a chemical bonding method (bonding using an adhesive or by heat sealing) or a method using a device (sewing with a thread; fixing by needles, pins or staples; fixing by a holding member). In the shown example, the holding member 70a is fixed by the pins 77.

Figure 30:
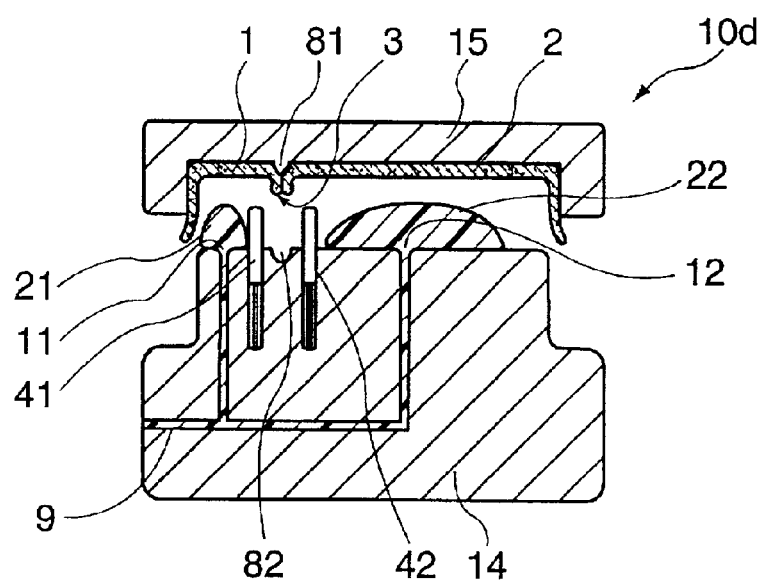
FIG. 30 is a schematic sectional view showing other example of the mold according to the first embodiment.

In both the first and second embodiments described above, it is desirable to provide an elongated projection extending along the boundary portion 3 at a position of the female mold part 15 corresponding to the boundary portion 3 of the skin materials 1, 2. FIG. 30 is a schematic sectional view showing an example of a mold of the first embodiment provided with such an elongated projection and FIG. 31 is a schematic sectional view showing an example of a mold of the second embodiment provided with such an elongated projection.

In a mold 10d shown in FIG. 30, an elongated projection 81 is formed at the planned boundary position of the female mold part 15, and a depression 82 corresponding to the shape of the projection 81 is formed at the planned boundary position of the male mold part 14. If a molded object is produced as in the case of the mold 10a of the first embodiment using such a mold 10d, the deformation of the boundary portion 3 can be more securely prevented by the projection 81. It should be noted that the depression 82 is not necessarily required. The projection 81 may be formed on the female mold part 15 of the mold 10b shown in FIG. 16 in which the holding member 50 is embedded.

Figure 31:
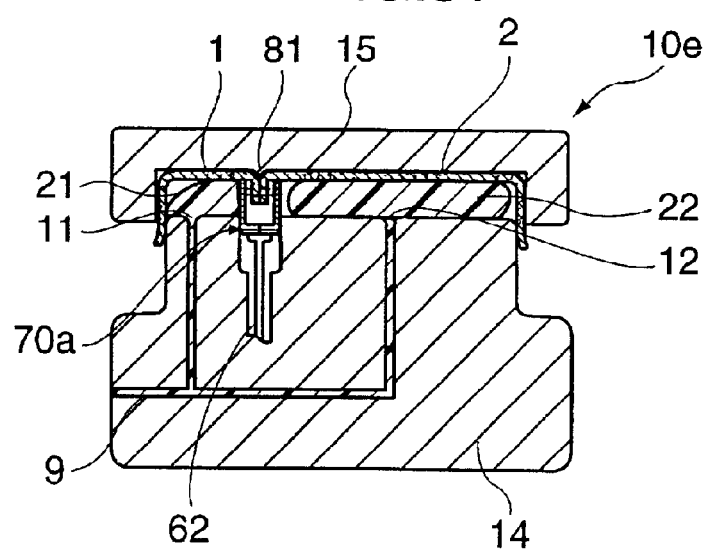
FIG. 31 is a sectional view showing other example of the mold according to the second embodiment.

FIG. 31 is a schematic sectional view showing an example of a mold 10e of the second embodiment provided with the projection 81. If a molded object is produced as in the case of the mold 10c shown in FIGS. 22 to 26 using such a mold 10e, the deformation of the boundary portion 3 can be more securely prevented by the projection 81.

Further according to the present invention, a molten thermoplastic resin including a foaming agent (foamable resin) may be used as the resin to be supplied from the first and second gates. In the case of using the foamble resin, it is desirable to foam the molded object in the mold although the molded object may be foamed after being taken out from the mold.

Figure 32:
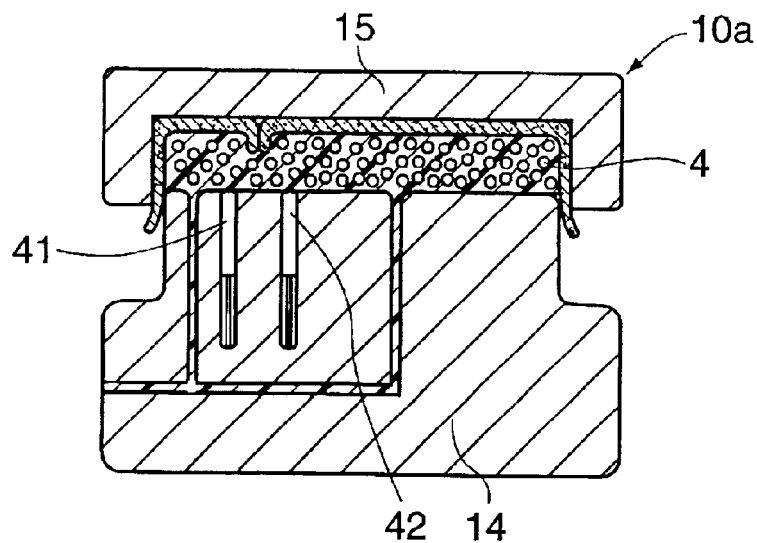
FIG. 32 is a schematic sectional view used for the explanation of other example of a producing method according to first embodiment.
Figure 33:
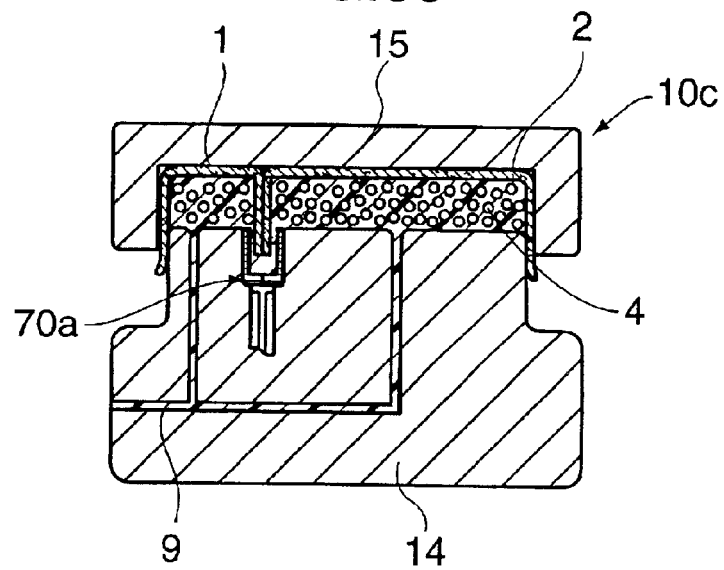
FIG. 33 is a schematic sectional view used for the explanation of other example of a producing method according to the second embodiment.

FIG. 32 is a schematic sectional view used for the explanation of a case where the resin is foamed in the mold of the first embodiment, and the mold 10a is used in this example. FIG. 33 is a schematic sectional view used for the explanation of a case where the resin is foamed in the mold of the second embodiment, and the mold 10c is used in this example. In both cases shown in FIGS. 32 and 33, the mold cavity is enlarged to foam the filled resin (resin for the base member) 4 by moving the male mold part 14 or the female mold part 15 in a direction opposite from the clamping direction (see FIGS. 32 and 33) after the filling of the foamable resins 21, 22 into the mold cavity is completed by molding (press molding mentioned above, injection molding mentioned below, etc.) (see FIGS. 10 and 25).

In the case of filling the molten foamable resins 21, 22 into the mold cavity, it is desirable to prevent a leak of a blowing gas by controlling a cavity clearance formed by the male mold part 14 and the female mold part 15 during the filling to thereby prevent an insufficient foaming after the completion of the filling of the resins. Specifically, the cavity clearance is normally suitably set according to molding conditions including the types of the skin materials 1, 2 and the temperature of the resin. In the case of filling the foamable resin, it is desirable to prevent the leak of the blowing gas by paying attention so as to make the cavity clearance smaller.

After the filling of the foamable resins 21, 22 into the mold cavity is completed, it is desirable to form a skin layer by cooling the resin outer layer prior to the expansion of the mold cavity. Since no sufficient foaming rate can be obtained if the skin layer is too thick, it is desirable to control the thickness of the skin layer to such a value that gives a sufficient foaming rate. The thickness of the skin layer can be controlled, for example, by adjusting a forming time of the skin layer in view of the thickness of the molded object and the temperature of the mold.

Upon expanding the mold cavity, an expansion degree (expansion margin) can be suitably determined according to the thickness (foaming rate) of a product to be produced. Upon expanding the mold cavity and foaming the resins, it is desirable to keep the resin blocking member (resin blocking plates of the first embodiment, the holding member of the second embodiment, etc.) accommodated in the mold.

The above foaming method can be adopted not only when the molds 10a, 10c are used, but also when various other molds are used.

According to the present invention, both of or one of the male mold part 14 and the female mold part 15 may be moved upon clamping. In the respective shown examples described above, the molded object is produced by press molding for pressing the resin by clamping after the supply of the resins is completed. However, clamping may need not be performed after the supply of the resins is completed, but may be performed during the supply of the resins. It is desirable to start clamping quickly after the completion of the supply when clamping is performed after the supply of the resins is completed. Further, although clamping is performed in vertical direction in the respective shown examples described above, clamping may be performed in a direction other than vertical direction (e.g. horizontal direction).

Further, the molding method is not limited to press molding, but may be injection molding or a combination of press molding and injection molding. For example, in the case of producing a molded object by injection molding, clamping is completed after the skin materials 1, 2 are placed in the same manner as pressing molding is applied, the resin blocking member (resin blocking plates of the first embodiment, the holding member of the second embodiment, etc.) is projected into the mold cavity, and the supply of the molten thermoplastic resins from the gates 11, 2 is started with the resin blocking member held in abutment against the female mold part 15 via the skin materials 1, 2. At a stage reached by continuing the supply of the resins where a high pressure is not excessively exerted on the resins 21, 22 supplied from the respective gates 11, 12, the resin blocking member is withdrawn and the resins 21, 22 are caused to enter the boundary portion 3 by the continual supply of the molten thermoplastic resins, thereby producing a molded object. In the case of combining press molding and injection molding, the same operations as those performed in the example of press molding are performed except that a short amount of resin is supplied at an initial stage, and then the resin is supplied by injection to fill up a deficiency at a suitable stage.

In both cases of press molding and injection molding, it is not necessarily required to start projecting the resin blocking member (resin blocking plates of the first embodiment, the holding member of the second embodiment, etc.) before starting the supply of the resins 21, 22, and it is sufficient to do so at latest until the resins 21, 22 reach the position where the resin blocking member is embedded. In the case of controlling the flows of the resins 21, 22 by projecting the resin blocking member, it is not necessary, but desirable to hold the resin blocking member in abutment against the mold part located at the front side of the skin materials. Particularly, it is desirable to hold the resin blocking member in abutment against the mold part located at the front side of the skin materials until the resins 21, 22 reach the position where the resin blocking member is embedded.

Figure 25:
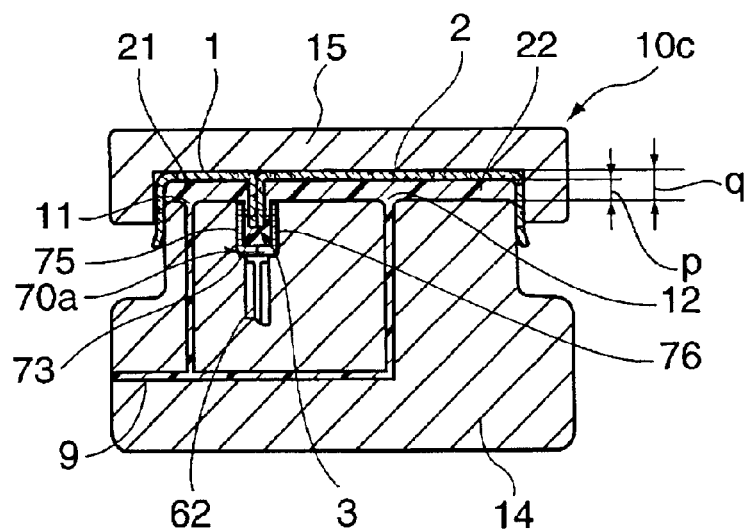
FIG. 25 is a fourth schematic sectional view showing the example of the mold according to the second embodiment.

In both cases of press molding and injection molding, it is sufficient to complete the withdrawal (accommodation) of the resin blocking member (resin blocking plates of the first embodiment, the holding member of the second embodiment, etc.) until the resins are completely filled into the mold cavity (space corresponding to the molded object) (see FIGS. 10 and 25). Specifically, in the case of press molding, it is sufficient to complete the withdrawal (accommodation) of the resin blocking member until clamping is completed and the mold cavity is filled up with the resins. In the case of injection molding, it is sufficient to complete the withdrawal (accommodation) of the resin blocking member until the necessary resin is all supplied by injection and the mold cavity is filled up with the resin.

A preferable molding method is press molding. In the case of injection molding, the skin materials may be damaged by being subject to high temperature and high pressure since the injected molten resin is immediately brought into contact with the skin materials. Contrary to this, since the resin is supplied with the mold largely opened in the case of press molding, there is a little likeliness of damaging the skin materials by a supplying pressure of the resin.

The movable member for projecting the resin blocking member from the molding surface is not particularly restricted, and various members including gears and balloons may be used in addition to the shaft-shaped member like the aforementioned shaft 62. Alternatively, biasing members including springs may be used as the movable member.

In the case of using a shaft-shaped member as the movable member, it is desirable to use a cylinder (air cylinder, hydraulic cylinder) to project the movable member (and the resin blocking member).

On the other hand, the above movable member may be used to withdraw (accommodate) the resin blocking member, but an other means may be used. For example, it is preferable to use a shaping pressure of the resin in order to withdraw (accommodate) the resin blocking member.

A pressure (power) for holding the resin blocking member may be constant, or may be varied by pressure control. In the case of a pressure control, for example, the holding pressure may be increased in order to enhance a resin blocking effect when the resin is filled into a space which corresponds to a molded object and gate-side of the resin blocking member, and the holding pressure may be reduced when the filling of the resin into the above space is substantially completed, thereby the resin blocking member is withdrawn into the mold by the shaping pressure of the resin.

The larger an area difference between the skin materials 1 and 2 (area difference between the skin materials 1 and 2 when the upper surface of the molded object is viewed after the molded object is produced), the more likely the displacement of the boundary portion 3 and wrinkling are to occur. However, since the flows of the resins are controlled by the resin blocking member according to the present invention, the displacement and wrinkling can be prevented from occurring. Thus, the larger the area difference between the skin materials 1 and 2, the more advantageously the present invention can be used. The present invention can be advantageously used if an area ratio of the skin materials 1 to 2 is about 1:1 to 1:10, particularly 1:1.5 to 1:10.

On the other hand, even if the area difference between the skin materials 1 and 2 is small (particularly in the case of equal areas), the displacement of the boundary portion 3 and wrinkling are likely to occur due to a difference in the flows of the resins in the case that an object to be molded is large and the number of the gates is increased and in the case that an object to be molded has a complicated shape. The present invention can be also advantageously used to produce such molded objects (large molded objects, molded objects having complicated shapes). Molded objects of large size or complicated shape include, for example, door trims and instrument panels of automotive vehicles.

The skin materials used in the present invention are not particularly restricted provided that they have boundary portions. For example, only one skin material may be used. Specifically, one skin material having two design surfaces may be used instead of the joined skin material in which the two skin materials 1, 2 are joined at the boundary portion 3. In the case of holding one skin material by the holding member, the skin material is bent at the boundary portion and the bent portion is held from back side by the holding member. In the case of using two skin materials, the boundary portion is invariably formed. Thus, the first and second skin materials 1 and 2 may be the same or may be different.

The number of the skin materials (or the number of the design surfaces) may be three or more. For example, in the case that a third skin material is joined in addition to the first and second skin materials, another resin blocking member may be arranged substantially along a planned boundary position with the third skin material and a molded object may be formed in the same manner as above.

It is sufficient to provide at least one gate for supplying the resin to the rear side of each skin material (or design surface), and a plurality of gates may be provided according to a size of each skin material (design surface). An amount of resin to be supplied from these gates and a supply timing thereof are suitably determined according to the size and shape of an object to be molded.

Further, in the respective shown examples, the thermoplastic resin is introduced into the mold through a common resin introducing path 9, which is branched off in the mold to supply the thermoplastic resin from the first and second gates 11, 12. However, separate resin introducing paths (one for the first gate(s) 11 and one for the second gate(s) 12) may be provided.

The skin materials usable in the present invention include fabrics (e.g. woven and knitted fabrics such as moquettes, tricot fabrics; nonwoven fabrics), synthetic resin sheets (or films), metallic foils.

Natural fibers (cotton, wool, silk, linen, etc.) and synthetic fibers (polyamide fibers such as nylon, polyester fibers) can be used as fibers for forming the nonwoven fabrics. These fibers may be used singly or in combination and may be spun (such as mixed spinning) if necessary. Nonwoven fabrics produced by a conventional method (needle punched type, thermal bond type, spunbond type, meltblow type, spunlace type, etc.) using the above fibers can be used.

The synthetic resin sheet or film used may, for example, be a sheet or film of a thermoplastic resin (e.g. polyolefin series thermoplastic resin such as polypropylene or polyethylene), or a sheet or film of a polyolefin series thermoplastic elastomer. The polyolefin series thermoplastic resins (or elastomers) have an excellent property of adhering to the base member upon being heated.

The skin material may be laminated with a backing layer (foamed layer, reinforcing layer, heat-resistant layer, etc.) if necessary. The foamed layer may be made of a foamed polyolefin material (e.g. foamed material of polypropylene or polyethylene), a foamed polyvinyl halide material (e.g. foamed polyvinyl chloride material), and a foamed polyurethane material (soft or semi-rigid foamed polyurethane material).

The reinforcing layer may be made of a nonwoven fabric, a synthetic resin sheet or film. The same materials mentioned for the skin material can be used as these nonwoven fabric, synthetic resin sheet and film.

A single backing layer may be used or a plurality of backing layers may be used in combination. Preferably, the backing layer is thermally laminated with the skin material by applying heat fusion to the skin material or to the backing layer.

The thermoplastic resin used to form the base member 4 of the molded object is not particularly restricted as long as press molding or injection molding can be applied. For example, polyolefin series resins (polypropylene, polyethylene, etc.), styrene series resins (polystyrene, styrene-butadiene block copolymer, acrylonitrile-styrene-butadiene block copolymer, etc.), polyamide series resins (nylon, etc.), halogen-containing resins (polyvinyl chloride, etc.), polycarbonate series resins, and homo- or copolymer of (meta)acrylate (acrylic resins, etc.) may be used as such a thermoplastic resin. The above thermoplastic resins may also be thermoplastic elastomers. For example, an olefin series thermoplastic elastomer (e.g. ethylene-propylene copolymer (EPM), ethylene-propylene-diene copolymer (EPDM)) may be used.

The above thermoplastic resins (and thermoplastic elastomers) may be used singly or in combination of two or more kinds. For example, they may be used as a polymer alloy.

Further, the above thermoplastic resins (and thermoplastic elastomers) may contain various additives including fillers (inorganic fillers such as glass fibers, organic fillers, etc.), pigments, lubricants, antistatic agents, and stabilizing agents.

The above thermoplastic resins (and thermoplastic elastomers) may also contain foaming agents. A molded object formed with the foamed base member 4 can be obtained by foaming the resin by the foaming agent. Known chemical foaming agents (decomposable foaming agent, etc.) used to foam thermoplastic resins can be used as the above foaming agent. For example, inorganic foaming agents such as sodium bicarbonate, ammonium bicarbonate and ammonium carbonate; nitroso compounds such as N,N'-dinitrosopentamethylenetetramine; azo compounds such as azodicarbonamide and azobisisobutyronitrile; sulfonyl hydrazides such as benzenesulfonylhydrazide, toluenesulfonylhydrazide, diphenylsulfone-3,3'-disulfonylhydrazide; p-toluenesulfonylsemicarbazide can be used as the foaming agent. It is preferable to add a salicylic acid, a urea or a foaming auxiliary containing these if necessary. The foaming agent can be suitably selected in consideration of the melt temperature of the thermoplastic resin used and the required foaming rate. Further, the added amount of the foaming agent can be suitably set in consideration of a required strength and a required density of an object to be molded. Generally, about 0.1 to 5 mass parts of the foaming agent is added to 100 mass part of the resin. In the case of foaming the resin, the chemical foaming agent may be contained in the thermoplastic resin, or a volatile liquid foaming agent or a gaseous foaming agent may be directly pressed into the molten resin in the mold. Carbon dioxide, nitrogen and the like can be used as the volatile liquid foaming agent and the gaseous foaming agent.

In summary, the mold according to the present invention comprises a pair of male and female mold parts for producing a multilayer molded article by supplying the molten thermoplastic resin to the rear sides of the first and second skin materials adjacent to each other on the same plane and adhering the skin materials and the thermoplastic resin to each other, wherein the mold part located at the rear side of the skin materials includes the first gate for supplying the molten thermoplastic resin to the rear side of the first skin material, the second gate for supplying the molten thermoplastic resin to the rear side of the second skin material, a resin blocking member which is so embedded in a molding surface of this mold part as to extend substantially along a boundary portion between the first and second skin materials, and the movable member for projecting the resin blocking member from the molding surface.

If such a mold is used, the flows of the resins toward the boundary portion can be controlled since the resin blocking member is so embedded as to be projectable substantially along the planned boundary position. Thus, the displacement of the boundary portion and wrinkling can be securely prevented from occurring.

It is desirable to use the resin blocking plate, or the holding member and the like as the resin blocking member. In the case of using the resin blocking plate as the resin blocking member, the resin blocking plate(s) are embedded between the boundary portion and the gate(s) at the both sides or one side (preferably both sides) of the boundary portion. If the resin blocking plate is used, the arrival timings of the resins at the boundary portion can be controlled by blocking the flow of the resin toward the boundary portion, thereby securely preventing the displacement of the boundary portion and wrinkling. In the case of using the resin blocking plate, it is desirable to embed the holding member in the mold part located at the rear sides of the skin materials. This holding member is adapted to tightly hold the boundary portion of the first and second skin materials and embedded at the position of the molding surface corresponding to the boundary portion.

In the case of using the holding member as the resin blocking member, this holding member is similar to the one used together with the resin blocking plate in that it is adapted to tightly hold the boundary portion of the first and second skin materials and embedded at the position corresponding to the boundary portion, but differs therefrom in that it is projected by the movable member. The sidewalls of the holding member as the resin blocking member serve as the resin blocking walls for preventing the resins from the first and second gates from flowing toward the boundary portion when the holding member is projecting. If the mold provided with such a holding member is used, the flows of the resins toward the boundary portion can be prevented by the sidewalls of the holding member. Thus, the displacement of the boundary portion (boundary line) of the skin materials and wrinkling can be securely prevented.

The mold part located at the front side of the skin materials desirably includes the elongated projection continuously extending along the boundary portion at the position corresponding to the boundary portion.

According to the inventive method for producing a multilayer molded article, the first and the second skin materials adjacent to each other on the same plane are placed between a pair of male and female mold parts; the molten thermoplastic resin is supplied to the rear surface of the first skin material from the first gate formed in the molding surface of the mold part located at the rear side of the skin materials and the molten thermoplastic resin is supplied to the rear surface of the second skin material from the second gate formed in this molding surface; and the skin materials and the molten thermoplastic resins are adhered to each other to produce a multilayer molded article. More specifically, the thermoplastic resins are supplied with the resin blocking member which is so embedded in the molding surface at the rear side of the skin materials as to extend substantially along the boundary portion of the skin materials projected, and the arrival timings of the resins at the boundary portion are controlled by blocking the flows of the resins from the respective gates toward the boundary portion by the resin blocking member and withdrawing the resin blocking member into the mold part before filling of the resins into the mold cavity is completed.

If one or more resin blocking plates are used as the resin blocking member in the inventive producing method, it is desirable to project and withdraw the resin blocking plate(s) at the both sides or one side of the boundary portion. The first and second gates often have such a positional relationship that a distance of one of the first and second gates to the position corresponding to the boundary portion is shorter than a distance of the other thereto. In the case of embedding the resin blocking plate at one side of the boundary portion, it is desirable to embed it at the side where the closer gate to the boundary portion is formed. Then, the arrival timings of the resins at the boundary portion are controlled by temporarily blocking the resin supplied from the closer gate by the projection of the resin blocking plate and withdrawing the resin blocking plate into the mold part in accordance with the arrival timing of the resin from the more distant gate. On the other hand, in the case of embedding the resin blocking plates at the both sides of the boundary portion, the arrival timings of the resins at the boundary portion are controlled by withdrawing the resin blocking plates into the mold part after temporarily blocking the resin supplied from the closer gate by the projection of the resin blocking plate at one side and temporarily blocking the resin supplied from the more distant gate by the projection of the resin blocking plate at the other side.

In the case of using the holding member as the resin blocking member in the inventive producing method, it is desirable to embed the holding member at the position corresponding to the boundary portion. Then, when the holding member tightly holding the boundary portion of the first and second skin materials from the rear side of the skin materials is projected into the mold cavity and the molten thermoplastic resins supplied from the first and second gates are filled into the mold cavity, the resins are prevented from flowing toward the boundary portion by the side walls of the holding members and then the resins are permitted to flow toward the boundary portion by withdrawing the holding member into the mold part.

In the inventive producing method, it is desirable to hold the resin blocking member in abutment against the molding surface of the mold part located at the front side of the skin materials via the skin materials until the resins flowing from the gates reach the embedded position of the resin blocking member. The skin materials may be shaped in conformity with the shape of the multilayer molded article to be produced, before being placed in the mold.

A preferable molding method is a press molding method according to which the mold cavity is filled with the resin by pressing the supplied molten resins with the male and female mold parts.

It is convenient to withdraw the resin blocking member projecting into the mold cavity into the mold part by the shaping pressures of the resins.

A molten thermoplastic resin containing a foaming agent may be used as the resins to be supplied from the first and second gates. In such a case, the mold cavity is expanded and the resins are foamed after filling of the resins into the mold cavity is completed.

This application is based on Japanese Patent Application No. 2001-101721 filed in Japan On Mar. 30, 2001, Japanese Patent Application No. 2001-101722 filed in Japan on Mar. 30, 2001, Japanese Patent Application No. 2001-283890 filed in Japan on Sep. 18, 2001, Japanese Patent Application No. 2001-283891 filed in Japan on Sep. 18, 2001, the contents of which are hereby incorporated by reference.

What is claimed is:

1. A mold comprising a pair of male and female mold parts adapted for producing a multilayer molded article by supplying a molten thermoplastic resin to the rear sides of a first skin material and a second skin material that are adjacent to each other on the same plane and adhering the skin materials and the thermoplastic resin to each other, wherein said pair of mold parts comprises a male mold part and a female mold part, provided that one of said mold parts is adapted so as to be opposing the rear side of the first skin material and of the second skin material when the multilayer molded material is being produced, and the mold part opposing the rear sides of the skin materials includes:

a first gate for supplying the molten thermoplastic resin to the rear side of the first skin material, a second gate for supplying the molten resin to the rear side of the second skin material, a molding surface and a resin blocking member which is so embedded in the molding surface of the mold part so as to extend substantially along a boundary portion between the first and second skin materials, and a movable member for projecting the resin blocking member from the molding surface.

2. A mold according to claim 1, wherein the resin blocking member is one or more resin blocking plates and the resin blocking plate(s) is/are embedded, at the both sides or one side of the boundary portion, between the boundary portion and the gate(s).

3. A mold according to claim 2, wherein the resin blocking plates are embedded at the both sides of the boundary portion.

4. A mold according to claim 2, wherein the mold part opposing the rear sides of the skin materials includes a holding member embedded at a position of the molding surface corresponding to the boundary portion for tightly holding the boundary portion.

5. A mold according to claim 1, wherein the resin blocking member is a holding member for tightly holding the boundary portion of the first and second skin materials, and the holding member is embedded at a position of the molding surface corresponding to the boundary portion.

6. A mold according to claim 5, wherein side walls of the holding member serve as resin blocking walls for preventing the resins from the first and second gates from flowing toward the boundary portion when the holding member is projecting.

7. A mold according to claim 1, wherein one of the mold parts is opposing the front sides of the skin materials and includes an elongated projection continuously extending along the boundary portion at a position corresponding to the boundary portion.

* * * * *